US012154386B2

(12) United States Patent
Gupta et al.

(10) Patent No.: US 12,154,386 B2
(45) Date of Patent: Nov. 26, 2024

(54) IDENTITY RECOGNITION UTILIZING FACE-ASSOCIATED BODY CHARACTERISTICS

(71) Applicant: Apple Inc., Cupertino, CA (US)

(72) Inventors: Nitin Gupta, Cupertino, CA (US); Jingwen Zhu, Santa Clara, CA (US); Jonghoon Jin, Cupertino, CA (US); Andrew C. Edwards, Altadena, CA (US); Floris Chabert, San Francisco, CA (US); Vinay Sharma, Palo Alto, CA (US); Hendrik Dahlkamp, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 376 days.

(21) Appl. No.: 17/743,416

(22) Filed: May 12, 2022

(65) Prior Publication Data

US 2022/0366727 A1    Nov. 17, 2022

Related U.S. Application Data

(60) Provisional application No. 63/188,949, filed on May 14, 2021.

(51) Int. Cl.
*G06V 40/50* (2022.01)
*G06V 40/10* (2022.01)
(Continued)

(52) U.S. Cl.
CPC ............ *G06V 40/70* (2022.01); *G06V 40/103* (2022.01); *G06V 40/172* (2022.01); *G06V 40/50* (2022.01)

(58) Field of Classification Search
CPC .... G06V 40/70; G06V 40/103; G06V 40/172; G06V 40/50; G06V 20/52
See application file for complete search history.

(56) References Cited

U.S. PATENT DOCUMENTS 8,924,735 B2    12/2014  Forbes et al.
10,789,820 B1    9/2020  Jones et al.
(Continued)

OTHER PUBLICATIONS

Long, Jianfeng et al., "Near Infrared Face Image Quality Assessment System of Video Sequences," 2011. IEEE Computer Society, 978-0-7695-4541-7/11. 5 pages.
(Continued)

*Primary Examiner* — Chuong A Ngo
(74) *Attorney, Agent, or Firm* — Kilpatrick Townsend & Stockton LLP

(57) ABSTRACT

Techniques are disclosed for providing a notification indicating an identity of a first person based on face-associated body characteristics. For example, a device performs facial recognition to identify the identity of the first person shown in a first video feed. The device also identifies and stores physical characteristic information of the first person from the first video feed, the stored information associated with the identity of the first person based on the recognized face. Subsequently, the device receives a second video feed showing a second person whose face is determined to not be recognized by the device. The device compares the stored physical characteristic information of the first person with additional physical characteristic information of the second person shown in the second video feed. Based on the comparison, the device provides a notification indicating whether the identity of the second person corresponds to the identity of the first person.

20 Claims, 8 Drawing Sheets

(51) Int. Cl.
*G06V 40/16* (2022.01)
*G06V 40/70* (2022.01)

(56) References Cited

U.S. PATENT DOCUMENTS

| 2008/0137918 | A1* | 6/2008 | Eura | G06F 18/28 |
| | | | | 382/118 |
| 2013/0076487 | A1 | 3/2013 | Evers | |
| 2020/0237225 | A1 | 7/2020 | Addison et al. | |
| 2020/0380299 | A1* | 12/2020 | Hu | G06V 40/10 |
| 2022/0157078 | A1 | 5/2022 | Boic | |

OTHER PUBLICATIONS

"International Search Report and Written Opinion," mailed Nov. 9, 2022 in International Application No. PCT/US2000/029314. 19 pages.

Bondi Enrico et al., "Long Term Person Re-Identification from Depth Cameras using Facial and Skeleton Data." Media Integration and Communication Center—MI, University of Florence, Florence, Italy. May 16, 2018.13 pages.

"International Search Report and Written Opinion," mailed Dec. 7, 2023 in International Application No. PCT/US2023/032393. 12 pages.

Munaro, Matteo, "3D Reconstruction of Freely Moving Persons for Re-Identification with a Depth Sensor." Institute of Electrical and Electronics Engineers, International Conference on Robotics and Automation. pp. 4512-4519. May 31, 2014.

Godil, Afzal et al., "Human Identification from Body Shape," National Institute of Standards and Technology. Proceedings of the Fourth International Conference on 3-D Digital Imaging and Modeling (3DIM'03). Downloaded Feb. 26, 2021. 7 pages.G.

PCT/US2022/029314 , "Invitation to Pay Additional Fees and, Where Applicable, Protest Fee", Aug. 8, 2022, 9 pages.

* cited by examiner

IDENTITY RECOGNITION UTILIZING FACE-ASSOCIATED BODY CHARACTERISTICS

CROSS-REFERENCES TO RELATED APPLICATIONS

This application is claims priority under 35 U.S.C. § 119(e) to U.S. Provisional Application No. 63/188,949, filed on May 14, 2021, entitled "IDENTITY RECOGNITION UTILIZING FACE-ASSOCIATED BODY CHARACTERISTICS," the contents of each of which are herein incorporated by reference.

BACKGROUND

Techniques exist for performing identity recognition of a person using an image of the person's face. For example, a mobile phone camera may capture an image showing a portion of a person's face. An application may analyze the image to determine characteristics of the person's face and then attempt to match the person's face with other known faces. However, identity recognition is a growing field and various challenges exist related to performing recognition. For example, sometimes a video camera may not be able to perform facial recognition of a person, given a particular video feed (e.g., if the person is facing away from the camera). In these scenarios, it may be difficult to accurately perform identity recognition of the person.

DETAILED DESCRIPTION

Figure 1:
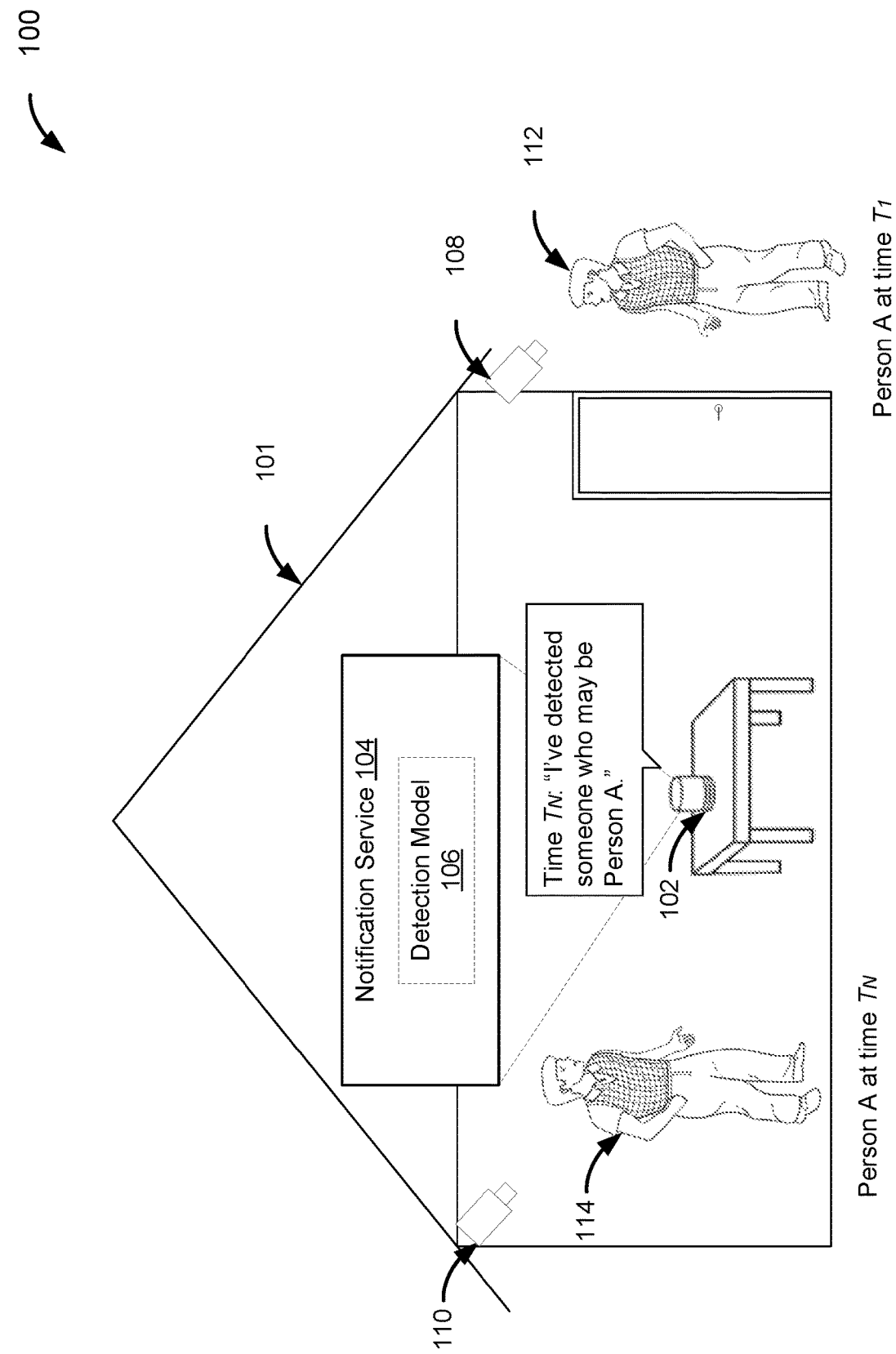
FIG. 1 is a simplified block diagram of an example system, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Techniques described in the present disclosure enable performing recognition of an identity of a particular person based on physical characteristics of the particular person. The physical characteristics of the particular person may be associated with their identity based on previously performing facial recognition of the particular person. In one example, a device may receive a first video feed, for example, showing a particular person (e.g., including their face and torso portion of their body) walking towards a camera. The device may perform facial recognition to identify the identity of the particular person. The device may further identify physical characteristics of the particular person from the first video feed, for example, based on analyzing other body features of the particular person (e.g., including their torso, clothing worn, etc.). The device may then store physical characteristic information of the particular person in association with the identity of the particular person based on having recognized the face of the particular person from the first video feed. A gallery of images may be stored, where each image of the gallery includes a torso, and the images of the torso can be associated with the particular person who's face had been identified. In some instances, the identified face may correspond to a person in a contacts list, such that the face/person are known by an owner/user of the device. Subsequently, the device can receive a second video feed showing a second person whose face is determined to not be recognized by the device (e.g., an obstructed view or poor image quality) or is not visible to the device (e.g., walking away from the camera). The device can compare the stored physical characteristic information of the first person (e.g., the gallery of images) with additional physical characteristic information of the second person shown in the second video feed (note: the second person may be the first person; however, this is yet to be determined). Based on the comparison, the device can provide a notification indicating whether the identity of the second person corresponds to the identity of the first person. The notification may be a message (e.g., a text, email, pop-up, etc.) or it may be a name or visual identifier on a screen displaying the frames or video. In this way, techniques may enable a device to identify a person without having a view or quality image of the face. Additionally, the device may provide notifications of the presence of a particular person in a wider range of scenarios and/or with higher precision/recall, for example, including when the person's face may not be shown in a video feed and/or recognizable by the device. In some examples, the gallery of images corresponding to physical characteristics (e.g., torso, etc.) may only be stored for a particular amount of time (e.g., one day, one week, or the like). In this way, the gallery of images may be repopulated each day (or longer) for each detected person.

In an illustrative example, consider a scenario in which a first device (e.g., a resident device) within a home environment provides notifications about the presence of a person located at a particular location associated with the home environment. In this example, the resident device (e.g., a smart speaker, a smart digital media player, and/or any device that may be configured or otherwise intended to be relatively stationary within a location (e.g., a home)) may be communicatively connected to a first camera (e.g., positioned to observe a home entrance location near the front door) and a second camera (e.g., positioned inside the home to survey an area within the home, such as a hallway, living room area, etc.). The resident device may receive a first video feed (e.g., including a first plurality of video frames) during a first time period (e.g., a first phase, during a particular weekday morning). The first plurality of video frames may show a first person approaching the front door of the home, whereby at least one of the frames of the first plurality of video frames includes a face of the first person. The resident device can identify an identity of the first person based at least in part on recognizing the face of the first person (e.g., utilizing a suitable facial recognition algorithm). For example, the resident device may have previously stored a faceprint of the first person (e.g., a personal contact associated with the home, such as a resident, friend, babysitter, housekeeper, or the like), whereby the faceprint corresponds to a unique multidimensional (e.g., vector-based) representation of the face. In one example, a dimension of the vector may be associated with at least one characteristic of the face of the contact. The facial recognition algorithm may compare a faceprint, determined from one of the frames of the first plurality of video frames, with the previously stored faceprint that is associated with the first person. Upon determining that the faceprints match, the resident device may thereby identify the identity of the first person shown in the first plurality of video frames (e.g., as matching the personal contact).

The resident device then may identify one or more physical characteristics of the first person, and then may store physical characteristic information corresponding to the identified one or more physical characteristics. For example, the resident device may determine that at least one of the frames of the first plurality of video frames includes both the recognized face and other body features of the first person, including, but not limited to a torso, one or more arms, and/or one or more legs. The resident device then may identify one or more physical characteristics of the first person based on the other body features. These physical characteristics may also be associated with, for example, a body shape, a texture and/or color of the body of the first person, a texture and/or color of an article of clothing worn by the first person, etc. In some embodiments, physical characteristic information corresponding to the identified one or more physical characteristics may be stored by the resident device. As noted, these physical characteristics may be stored (e.g., by the resident device) as a gallery of images (e.g., gallery of torsos), and may be only stored for one day (or, maybe be stored longer if desired). For example, similar to as described with respect to the faceprint (e.g., a multidimensional vector) above, the resident device may generate a bodyprint of the first person. The bodyprint may include a multidimensional vector that is associated with (e.g., represents) the one or more physical characteristics of the first person, whereby a dimension of the vector may be associated with at least one characteristic of the body of the contact. In some embodiments, as described further herein, a bodyprint (and/or faceprint) may utilize any suitable format and/or data structure that may be suitable for efficient comparison between bodyprints.

Continuing with the illustration above, the bodyprint may be stored in association with the identity of the first person. For example, the resident device may utilize the frame(s) that showed the recognized face and body features of the first person to associate the identity of the first person with the bodyprint. In this example, a cluster of bodyprints (e.g., the gallery of images) may also be generated and, respectively, stored in association with the identity of the first person. For example, a different bodyprint may be generated for respective frames of the first plurality of video frames that show at least a portion of the body of the first person. Using the illustration above, as the first person approaches the entrance to the home, video frames may respectively capture different aspects (e.g., shape, color, texture) of the person's torso, arms, legs, and/or other body features. Upon determining that the identified body (e.g., and/or body portion, as the case may be) in each frame is the same person (e.g., the first person) associated with the recognized face, the resident device may generate a bodyprint based on the respective frame and then associate the bodyprint with the identity of the first person. In some embodiments, the resident device may select a bodyprint to be included in the cluster of bodyprints based on determining that the bodyprint provides an acceptable information gain (e.g., above a threshold quality level) that may be subsequently used to compare against another bodyprint when performing identity recognition. It should be understood that a bodyprint generated from a particular frame may be a candidate for inclusion within the cluster of bodyprints even though the face of the first person may not be recognizable in the particular frame. This may be the case, for example, if the resident device determines (e.g., based on executing a motion tracking algorithm) that the body shown in the particular frame is the same body that is shown in a related frame of the first plurality of frames. In this example, the body (and/or body portion) shown in the related frame may include a face that is recognized by the resident device as corresponding to the identity of the first person.

Continuing with the illustration above, at a subsequent second time period (e.g., during a second phase), the resident device receives a second plurality of video frames that includes a second person. For this second plurality of video frames, the resident device may determine that a face of the second person is not recognized or is not in view by the first device. For example, the second plurality of video frames may show the body of the second person walking away from the camera, with a portion of their face facing away from the camera (and/or otherwise obscured). Additionally, the second plurality of video frames may be poor image quality, such that the face of the person is not recognizable at all. Accordingly, while the body of the second person may be captured in frames of the second plurality of video frames, the resident device may determine that the face (e.g., and/or identity) of the second person is not recognized based on facial recognition. The resident device thus may attempt to determine the identity of the second person based on comparing previously stored physical characteristic information (e.g., a bodyprint of the first person) with additional physical characteristic information (e.g., a bodyprint) of the second person. In this example, the resident device determines that the bodyprint of the first person matches the bodyprint of the second person (e.g., based on computing a Euclidean distance between bodyprint vectors). In some embodiments, a machine learning model of the resident device may be trained to generate the vectors and/or perform the comparison based on learning to associate a first bodyprint of a particular person with a second (e.g., different) bodyprint of the same person, whereby the training is performed over a plurality of training samples. Accordingly, the resident device may determine that the second bodyprint matches the first bodyprint (or at least some number or percentage of the bodyprints in the gallery (e.g., cluster) of bodyprints. When a match is detected, the resident device may provide a notification (e.g., an audio announcement and/or text-based message) indicating that the identity of the second person corresponds to the identity of the first person, or that identity of the second person is not known.

In some embodiments, the resident device may store a plurality of clusters of bodyprints, respectively, for contact persons associated with the home environment. Accordingly, when attempting to determine whether a recently determined bodyprint (e.g., of the second person, in the illustration above) matches a previously stored bodyprint, the resident device may compare different bodyprints of a same cluster with the recently determined bodyprint and/or compare bodyprints of a plurality of clusters with the recently determined bodyprint.

In some examples, the model used to generate the bodyprint vectors (or a different model) may determine that the second bodyprint is of poor image quality (e.g., below a threshold quality/confidence score). Various examples of this determination will be described below. When the second bodyprint is determined to be of poor quality (e.g., below the quality/confidence score), the second bodyprint may be used to compare against the gallery of images; however, it may not be added to the gallery. In this way, poor quality bodyprints will not affect future comparisons between future detected bodyprints and the gallery. Alternatively, in some examples, if the second bodyprint is determined to be of sufficiently good quality (e.g., above the confidence score), the second bodyprint can be added to the gallery for future comparisons. In either event, regardless of the confidence score, the second bodyprint may be used to compare against gallery. In this way, once a good quality gallery of bodyprints is established for the contact (e.g., a person identified in a user's contacts), the quality of the gallery will not be affected by future images (e.g., including images that are not actually bodyprints (e.g., not a torso) at all).

In some embodiments, a machine learning model executing on the resident device may also (and/or alternatively) be trained to compare other physical characteristics of a first person with a second person to determine if there is a match. In one example, the physical characteristics may be associated with a motion of a person over time (e.g., for example, a gait of the person as they walk). In this example, and, similar to as described above, a "motionprint" that captures a unique motion of the person over time may be stored in a suitable data structure (e.g., a multidimensional vector). A previously stored motionprint of a first person may be compared against a recently generated motionprint of a second person to determine if there is match. If so, then the resident device may utilize this information to determine whether an identity of the second person matches the identity of the first person.

Techniques described herein provide several technical advantages over existing systems. In one example, techniques described herein may enable a system to determine an identity of a person from a video feed even when the person's face may be determined to not be recognized by the system. This may improve upon existing systems by expanding the range of scenarios in which a user's identity may be recognized. This may, for example, improve a customer experience of a system operating in a home environment by optionally notifying users about the presence of a particular person in a location in the home. This functionality may be enabled even when a camera observing the location may not often capture a detailed (e.g., good quality) image of the face of a person at the location, thus making facial recognition difficult to accurately perform (e.g., with acceptable precision and/or recall). Accordingly, techniques described herein provide another mechanism (e.g., a fallback mechanism or a parallel mechanism) for performing identity recognition.

In another example, techniques described herein may be used to determine when one or more physical characteristics of a particular person are detected to have changed. For example, a system may detect a likelihood that clothing worn by the particular person may have changed from a first time period (e.g., in the morning) to a second time period (e.g., in the afternoon). In some embodiments, this may be useful for updating bodyprints of a particular person on a suitable cadence, to ensure that the accuracy of detection remains acceptable. In yet another example of a technical advantage, techniques described may enable a mechanism whereby a home environment that includes multiple cameras (e.g., each receiving video feeds) can utilize respective feeds of the cameras to generate a high-quality cluster of bodyprints of a person, based on frames drawn from the multiple cameras. The cluster of bodyprints of the person can further be synchronized across multiple devices (e.g., user devices, resident devices) of the home environment, so that each device has a high quality set of bodyprints (and/or faceprints) that may be used for identity detection in the home environment setting. In some embodiments, this synchronization mechanism among a plurality of devices (e.g., resident devices) of the home environment may enable more privacy controls. For example, instead of a device first uploading frames and/or bodyprints to a remote cloud server (e.g., to be subsequently retrieved from the cloud by another device of the home environment), a cluster of bodyprints may be synchronized locally among devices of the home environment.

For clarity of illustration, it should be understood that, although embodiments of the present disclosure are primarily directed to performing identity recognition of a person in a home environment setting, embodiments should not be construed to be so limited. For example, a system of the present disclosure may be used in any suitable environment, such as an office building, a warehouse, a parking lot, a public park, etc. Also, although embodiments described herein may primarily refer to providing a notification (e.g., an announcement) upon detecting an identity of a person (or detecting an unknown person) at a particular location, a system may take any suitable action upon performing identity recognition (e.g., granting access to a resource such as a door lock, denying access, performing an automated action, etc.).

FIG. 1 is a simplified block diagram 100 that illustrates a system notification service operating in an example environment, according to some embodiments. In FIG. 1, the example environment depicted is a home environment 101. The home environment 101 may be associated with one or more people (e.g., contact persons) who have some common affiliation (e.g., family members, roommates, a housekeeper, a babysitter, etc.). In this example, user 112 may represent an affiliated user (e.g., "Person A," who may be the housekeeper). Also, within the home environment 101 there may be a device 102 (e.g., a tablet, a smart home controller, a smart digital media player, a home automation device (e.g., that is part of a home automation system), or the like). The device 102 (e.g., a resident device of the home) may be communicatively connected to one or more observation cameras associated with the home environment 101. For example, the resident device may receive video feeds from observation camera 108 and observation camera 110, both cameras being associated with the home environment 101. Each video feed may include a plurality of video frames. In this example, both cameras may correspond to mounted observation cameras that are positioned to observe different locations associated with the home environment 101. For example, observation camera 108 may observe user 112 (e.g., including the face and other body characteristics of user 112) approaching the entrance to the home (e.g., nearing the front door of the home) at time $T_1$ (during a first time period). Meanwhile, observation camera 110 may be positioned to observe an interior area (e.g., a corridor, room, etc.) of the home environment 101. In this example, the observation camera 110 may be positioned so that, during a subsequent time period (at time $T_N$) from when the user 112 entered the home, the observation camera 110 may capture user 114 (who may be the same (or different) person as user 112) facing away from the camera 110. The device 102 may include a notification service 104 that executes a detection model 106 to detect a person's identity (e.g., a trained machine learning model). As described further herein, the notification service 104 may be enabled to provide a notification of the identity of a person shown in a video feed, even when the face of the person may not be recognized by the notification service 104. For example, the notification service 104 may notify the home that the detected user 114 matches the identity of user 112 (e.g., "Person A").

Turning to the elements of FIG. 1 in further detail, the home environment 101 may be associated with a physical location and/or structure (e.g., a house and/or a surrounding yard or walkway, etc.), whereby one or more cameras may be positioned within the home environment 101. It should be understood that techniques described herein may be performed within any suitable physical environment (e.g., a physical location), whereby one or more cameras may be positioned. Some non-limiting examples include a house, a recreation center, an office building, an outdoor park, a parking lot, etc.

Using the home environment 101 as a representative physical setting, a camera of the home environment 101 may be positioned at any suitable location associated with the home environment 101. In diagram 100, observation camera 108 is positioned near the front door to survey the outdoor entrance to the home, and observation camera 110 is positioned to survey an interior corridor of the home. In other embodiments, cameras may survey additional and/or alternate locations of the home environment 101, including, for example, the backyard of the home, a particular room (e.g., a living room), a garage, etc. In some non-limiting examples, an observation camera may be a webcam, a pan-tilt-zoom (PTZ) camera, etc., which may be communicatively connected to a separate device (e.g., device 102). In some examples, an observation camera may be a component of a user device (e.g., a tablet, a mobile phone), which may, in turn, be connected to a separate device (e.g., device 102). In some embodiments, the device 102 itself may include an observation camera. It should be understood that any suitable arrangement may be used to communicatively connect cameras and devices, as described herein.

Using the example of diagram 100, the observation cameras are communicatively connected (e.g., via a WiFi signal) to the device 102, whereby the observation cameras respectively transmit a video feed of any suitable image (e.g., frame) quality to the device 102. In some embodiments, any suitable number of observation cameras (e.g., one camera, two cameras, ten cameras, etc.) may be utilized for performing techniques described herein. For example, in one embodiment, a sole observation camera (e.g., observation camera 108) may be utilized to perform techniques herein. In this example, the observation camera 108 may be utilized to perform identity recognition, not only when user 112 approaches the home entrance, but also at a later time, when the user 112 is leaving the home and the user's face may be facing away from camera 108.

In some embodiments, the device 102 may be any suitable computing device that is associated with (e.g., resides in) a particular environment and is configured to receive a video feed (e.g., a plurality of video frames) from an observation camera, analyze the frames to determine if a detected person in the video frames matches a particular identity, and then perform one or more operations upon completion of the analysis (e.g., providing a notification to a user or tagging that user with their identity for logging, later review of the feed, and/or while viewing a live stream of the video). As depicted in diagram 100, the device 102 may correspond to a resident device. In some non-limiting examples, a resident device may be a smart speaker, a smart TV device, a tablet device, a smart digital media player (e.g., configured to provide streaming media to a TV), etc. Although techniques described herein may be primarily described in a context of being performed by a resident device (e.g., resident device 102), it should be understood that embodiments are not so limiting. For example, in some embodiments, device 102 may correspond to a user device (e.g., a tablet device, a mobile phone, a personal computer (PC) or a server device.

Continuing with the example of FIG. 1, resident device 102 may correspond to a smart speaker device. Upon the resident device 102 determining a recognition of the face of the user 112 (e.g., approaching the home entrance and/or moving within the house), the resident device 102 may provide a notification by announcing, for example, that a particular contact of the home environment 101 (e.g., user 112) has arrived. In another example, the resident device 102 may transmit a message to one or more user devices that the particular contact has arrived. For example, an alert message may pop up on a display of a user device. It should be understood that notifications may be provided by a resident device using any suitable channel and/or method, depending, for example, on the type of resident device, a type of user device, the surrounding environment, etc. For example, consider another embodiment, where the resident device may correspond to a smart TV device (e.g., a digital media player that is connected to a TV). The smart TV device may be equipped to present a graphical user interface (GUI) on the TV, which may include a Picture-in-Picture (PIP) presentation. In this example, the resident device may provide a notification in the form of an audiovisual (AV) feed. For example, the resident device may display a video feed (e.g., received from observation camera 108 or 110) in the inset window of the TV. Also, in the case where an observation camera and/or smart TV device may be equipped with a two-way audio (e.g., having a speaker and microphone), the resident device may enable bi-directional communication between a user in the home environment and the person (e.g., user 112) outside.

In some embodiments, the resident device 102 may contain a local memory repository that is suitable for storing and processing information associated with images received from one or more cameras. This may include, for example, physical characteristic information of a person detected in an image. In some embodiments, physical characteristic information may include facial characteristics of the person (e.g., stored within a faceprint). In some embodiments, physical characteristic information may also and/or alternatively include non-facial characteristics associated with the body of the person and/or movements of the body. This information may be associated with, for example, a head of a person, a torso of the person, a gait of the person, one or more arms or legs, a body shape, etc. In some embodiments, information associated with the body of the person may be included within a bodyprint (e.g., a multidimensional vector), described further herein. In some embodiments, physical characteristic information may include information associated with a texture or color of the body of the person and/or an article of clothing worn by the person. In some embodiments, physical characteristic information may include any suitable combination of facial and/or non-facial characteristics associated with a person's body. In some embodiments, the resident device 102 may store physical characteristic information of a person in associated within an identity of the person. For example, using diagram 100 for illustration, the resident device 102 may store, among other things, a faceprint of user 112, who may be a contact of the home environment.

In some embodiments, physical characteristic information (e.g., a faceprint, a bodyprint, an image, etc.) of a first person may captured and/or stored in association with the identity of the first person (e.g., user 112) at any suitable time, and subsequently processed according to any suitable method. For example, consider an illustrative scenario in which the resident device 102 operates the notification service 104, which may execute the detection model 106. The notification service 104 may receive images of the first person (e.g., user 112, "Person A" in FIG. 1) at a time before time $T_1$ from a suitable source (e.g., a photo library of a user device, an observation camera, etc.), generate a faceprint from the image (e.g., via the detection model 106), and store the faceprint within a set of reference faceprints for user 112. Subsequently, at time $T_1$, the notification service 104 of resident device 102 may receive a first plurality of frames (e.g., in a video feed) from observation camera 108. The detection model 106 of resident device 102 may then utilize the set of reference faceprints of the first person (e.g., user 112) to perform facial recognition. Upon recognizing the face of user 112, the resident device 102 may identify the identity of user 112 (e.g., via the previously stored association between the identity of user 112 and facial characteristic information (e.g., a faceprint) of user 112). Upon identifying the identity of the user 112, in this example, the resident device 102 (e.g., via the detection model 106) may identify one or more physical characteristics of the body of user 112 from one or more frames of the first plurality of frames that were used to identify the face of user 112. The resident device 102 may thereby store physical characteristic information (e.g., a bodyprint and/or a cluster of bodyprints) of user 112 in association with the identity of the first person (e.g., user 112) based on the recognized face shown in at least one frame of the first plurality of frames.

Continuing with the above scenario, at a subsequent time $T_N$, the notification service 104 of resident device 102 may receive a second plurality of video frames, this time, from observation camera 110 within the home environment 101. As noted above, it should be understood that the second plurality of video frames may alternatively be received from the same observation camera 108 from which the first plurality of frames was received by the resident device 102. In this example, the resident device 102 may determine that the face of a second person (e.g., user 114, who may (or may not) be the same person as user 112) may not be recognizable via facial recognition (e.g., because the person may be facing away from the observation camera 110). The resident device 102 (e.g., via the detection model 106) may determine additional physical characteristic information (e.g., corresponding to one or more bodyprints) of the second person shown in the second plurality of frames and then compare the additional physical characteristic information with the previously stored physical characteristic information of the first person (e.g., from the first plurality of video frames received at time $T_1$). It should be understood that the detection model 106 of resident device 102 may compare the additional physical characteristic information with bodyprints (and/or clusters of bodyprints) of a plurality of people (e.g., corresponding to contacts of the home environment 101), to determine if there is a match. Depending on whether a match is determined via the comparison, the notification service 104 of resident device 102 may then provide a notification (e.g., via an audio message and/or via a message to another device) indicating whether an identity of the second person shown within the second plurality of frames corresponds to the identity of the first person shown in the first plurality of frames. In this example, as depicted within diagram 100, the resident device 102 determines that the identity of the second person (e.g., user 114) corresponds to (e.g., matches) the identity of the first person (e.g., that the second person is likely "Person A," whereby user 114 is the same person as user 112)). At time $T_N$, the resident device 102 (e.g., a smart speaker) may then output an audio message, "I've detected someone who may be Person A."

In some embodiments, a plurality of devices may be synchronized within the home environment. For example, consider a scenario in which resident device 102 may be a first device of a plurality of resident devices (e.g., including the first device and a second device) of the home environment 101 (e.g., positioned in different locations of the home environment 101). Each device may execute a notification service similar to notification service 104. In this scenario, the first device and the second device may synchronize physical characteristic information (e.g., bodyprints) of a particular person (e.g., a contact of the home environment 101). For example, using the illustration of diagram 100, the first device and the second device may respectively maintain (e.g., at time $T_0$) synchronized clusters of bodyprints for user 112 (e.g., a reference cluster of bodyprints), stored on each device. At time $T_1$, the first device may receive the first plurality of video frames, generate one or more bodyprints (and/or faceprints), and determine that at least one generated bodyprint is associated with a higher level of information gain than at least one bodyprint of the existing cluster of bodyprints for user 112. The first device may update the existing cluster with one or more new bodyprints for user 112. The first device may further transmit the new bodyprints associated with the higher information gain to the second device, which may in turn update its reference cluster of bodyprints for user 112. In at least this way, devices of the home environment 101 may be synchronized to ensure that they have up-to-date bodyprints for people. In some embodiments, devices of the home environment 101 may not synchronize bodyprints with each other. In some embodiments, the devices may exchange information (e.g., synchronization data, including image, faceprints, bodyprints, etc.) according to any suitable cadence and or set (or subset) of data.

In some examples, certain bodyprints may be discarded from analysis, either as a reference bodyprint for comparing to the cluster (e.g., gallery) or as a candidate for being added to the cluster. The determination of whether to discard a bodyprint may be made based on one or more rules (or heuristics). Example rules include discarding images with bodyprints (also referred to as torsos) that are rotated more than a threshold degree. For example, the person's body may be bent over (e.g., to pick something up) or the camera angle may be such that the body appears at an angle. Other rules include discarding images with a "roll" (e.g., a degree of rotation from vertical) that is greater than a threshold and/or discarding images that are in landscape mode (e.g., any images that are wider than they are tall). Additionally, an image may have a defined region of interest (e.g., a particular portion of the image that is believed to include a faceprint or a bodyprint). In some examples, when a detected bodyprint is too close to the edge of a region of interest, the image may be discarded. In some examples, any torsos that apply to these rules may be discarded or otherwise ignored as if they are not torsos at all.

Other rules may also be considered, as appropriate, for bodyprints that may be discarded with respect to addition to the cluster but may still be used for analysis against the cluster of bodyprints. For example, some bodyprints may be of a high enough level of quality that they can still be used to compare against the cluster of bodyprints for potentially identifying a person, but are too low of a level of quality to be included in the cluster. Thus, a confidence score may be generated for all torsos that passed the first set of discarding rules (see rules above about rotation, roll, and/or orientation), and this confidence score may be used to determine whether to add the torso to the cluster after the comparison is complete. These torsos that are not included in the gallery are, therefore, not associated with any recognized faces. This keeps the low-confidence score torsos from affecting future identification attempts, but still allows the system to attempt to make a match and identify a person based on a torso.

Various techniques can be employed for determining a confidence score for a given bodyprint (e.g., a torso). For example, image characteristics, including some combination of saturation, brightness, sharpness, and/or contrast may be used to generated a confidence score (also referred to herein as a quality score). In some cases, images that contain bodyprints may be analyzed for saturation levels, sharpness levels, brightness levels, and/or contrast levels. Using some combination of these techniques, a machine learning model output may include the confidence score. In some examples, if the confidence score is below a threshold, the image is deemed to be low quality, and if the confidence score is above the threshold, the image is determined to be high quality. Hi quality images may be added to the cluster, while low quality images may be excluded from the cluster.

In some examples, an image may be received (for examples, by the resident deice 102), and a confidence score may be generated by detection model 106. The confidence score may an output of the model that is separate from the multidimensional vector or it may part of the vector. In any event, the detection model 106 (or a different algorithm used prior to analysis by the detection model 106) may be configured to evaluate any combination of saturation, brightness, sharpness, and/or contrast to generate a confidence score.

In some examples, the evaluation of image characteristics may be a first type of confidence score, and a second type of confidence score may be received as an output from a deep learning model that is trained with bodyprints. In some embodiments, the model can be trained to output a confidence score, some training data may need to be labeled. The training data may consist of both good quality and bad quality bodyprint images, and these images may need to be labeled before the training. These training images may be labeled based on the two separate confidence scores determined by analysis described above (e.g., saturation, brightness, sharpness, and/or contrast). Additionally, the training data may be labeled based on a false bodyprint detection generated by a bodyprint detector. For example, if the bodyprint detector detects a false bodyprint (e.g., an image that does not actually have a bodyprint (e.g., torso) in it), that image can be labeled as false. Some images may be manually labeled as false. However, in other examples, an algorithm may be used to automatically generate false bodyprints (e.g., by automatically cropping a bodyprint image to remove the bodyprint from the image). For example, a bounding box may be generated in an image, and it may be moved up/down/left/right, as desired to crop out the bodyprint, thus creating a false bodyprint. These auto-generated false bodyprint images may also be automatically labeled as false. Thus, in some instances, the deep learning model may be trained with a) bodyprint images labeled based on the image characteristic described above, and/or b) bodyprint images labeled based on the false bodyprint detection score (e.g., either true or false). Given this training, the model can output a vector for the input and/or a confidence score that identifies whether the image includes a bodyprint and the quality of the bodyprint.

As described, in some examples, the final output of the model (e.g., confidence/quality score) can then be used to determine whether the image is to be added to the cluster of bodyprints, or merely used to compare against the existing cluster of bodyprints. If the confidence/quality score is above a threshold, the image can be used to compare against the current cluster, and then added to the cluster for future comparisons. On the other hand, if the confidence/quality score is below a threshold, the image may only be used to compare against the current cluster (e.g., in the contact recognizing phase) and then discarded. However, in some examples, the image may still only be added to the cluster if the face of the person was also recognized.

In some embodiments, an intermediary entity may perform one or more computing operations of the notification service 104. For example, consider a case in which the intermediary entity may correspond to a server device of a cloud computing platform. In this case, the resident device 102 may offload one or more operations to the remote platform. For example, instead of the resident device 102 being responsible for training the detection model 106, the cloud server may train the detection model 106, and then distribute the model to user devices and/or resident devices. In another example, the cloud server may receive data from the resident device 102 (e.g., physical characteristic information associated with one or more persons) and then compare the information to determine whether an identity match exists. It should be understood that any suitable combination of operations may be performed by the resident device 102, associated devices of the home environment 101, and/or an intermediary entity that may be external to the home environment 101.

Figure 2:
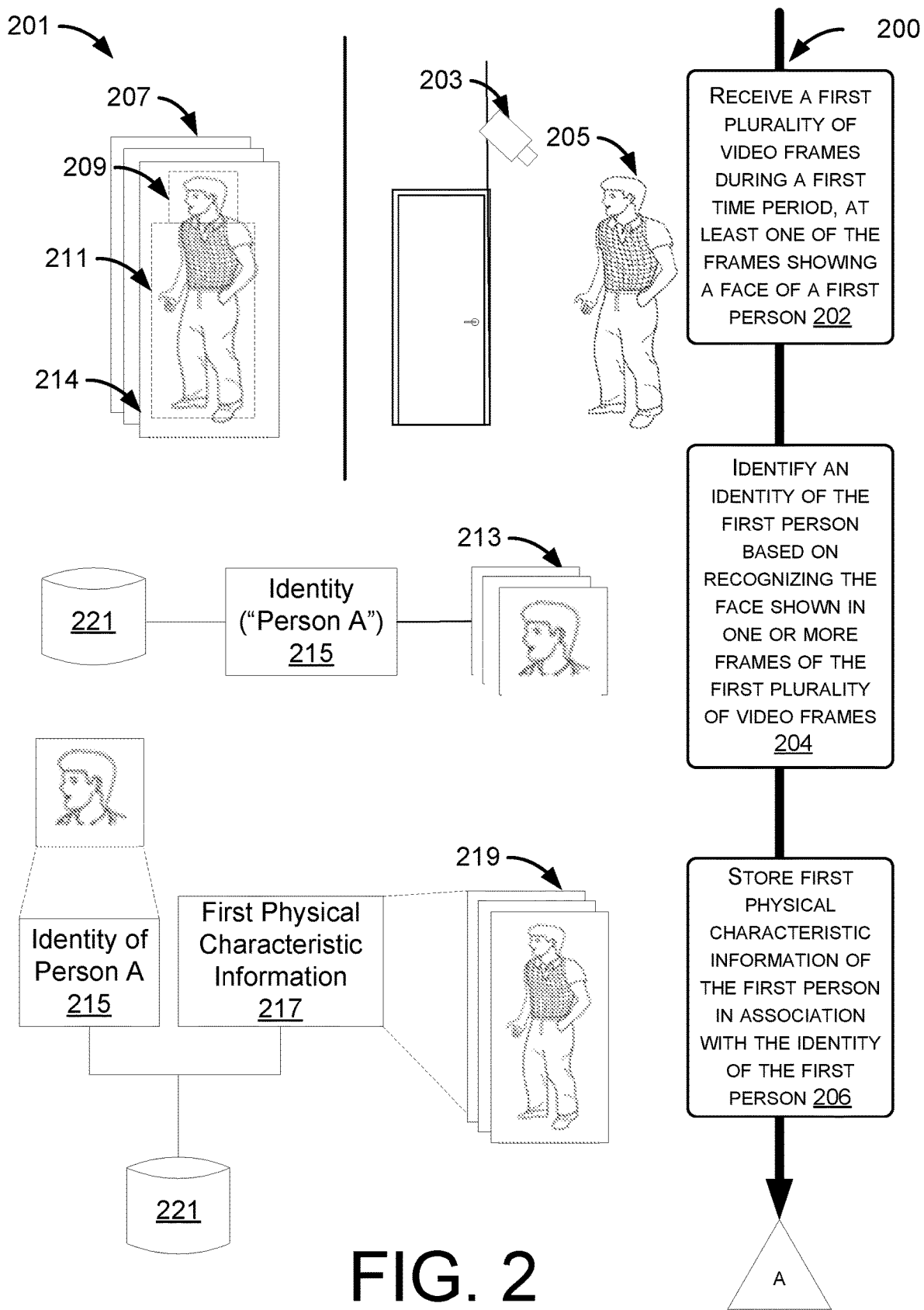
FIG. 2 is another simplified block diagram illustrating at least some example techniques for providing a notification based on determining the presence of a particular person at a location, according to some embodiments.
Figure 3:
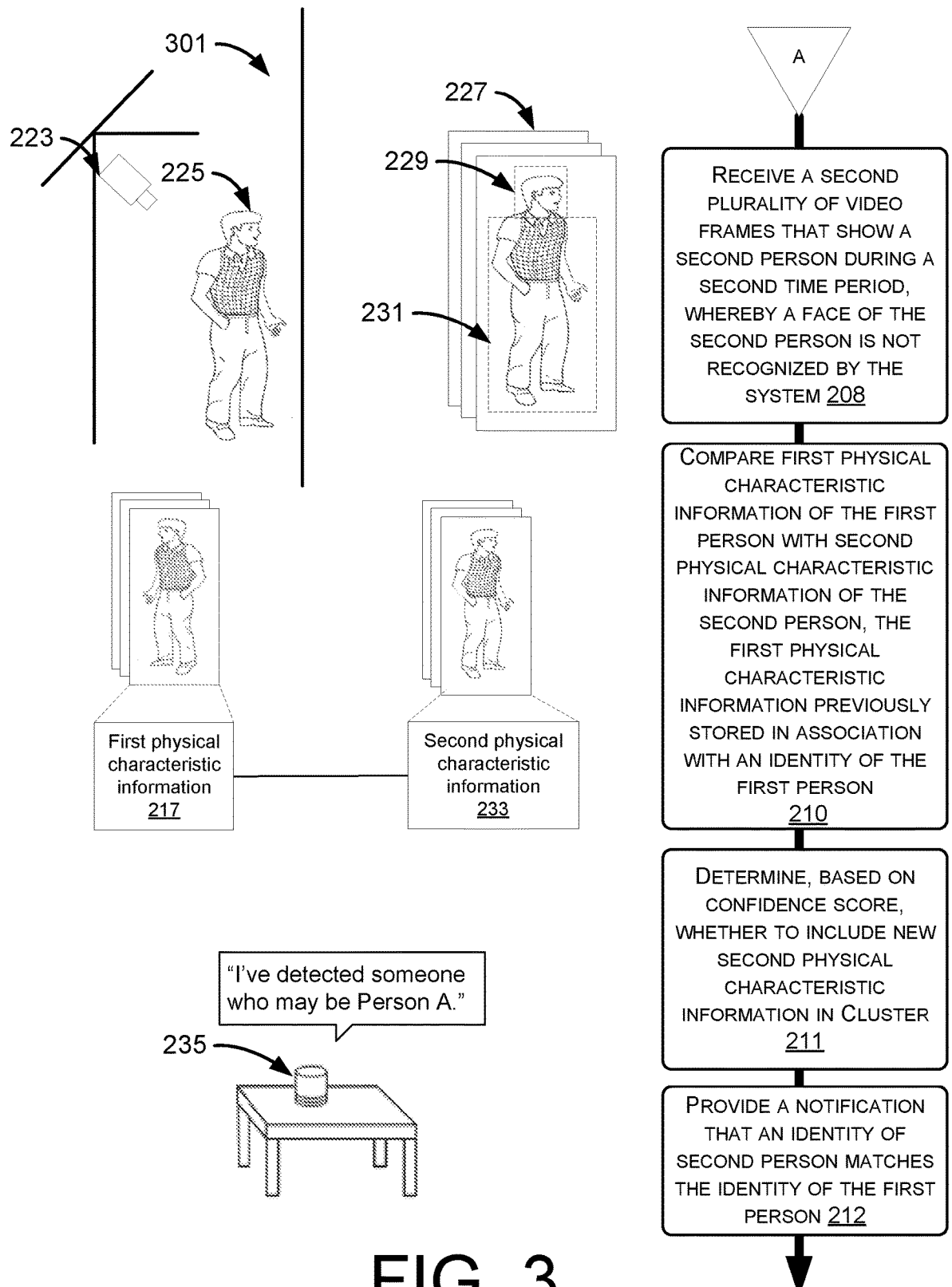
FIG. 3 is another simplified block diagram illustrating at least some example techniques for providing a notification based on determining the presence of a particular person at a location, according to some embodiments.

FIGS. 2 and 3 are simplified block diagrams illustrating at least some example techniques for providing a notification that a particular person may be detected at a location, according to some embodiments. The operations of process 200 span both FIGS. 2 and 3, and collectively correspond to an example high-level process for a system (e.g., resident device 102 of FIG. 1) providing the notification that the particular person was detected at the location (e.g., within a home environment context, which may be similar to the home environment 101 of FIG. 1). The operations of FIG. 2 may correspond to a first phase of the process, in which the system stores first physical characteristic information (e.g., including one or more bodyprints) of a first person identified in a first plurality of video frames. The operations of FIG. 3 may correspond to a second phase of the process that follows the first phase, in which the system receives and analyzes a second plurality of video frames (e.g., received during a subsequent time period), in which the system determines that a face of a second person shown in the second plurality of frames may not be recognized by the system (e.g., via facial recognition). The system accordingly determines second physical characteristic information of the second person and then compares the second physical characteristic information with the previously stored first physical characteristic information to determine the identity of the second person.

The diagram 201 of FIG. 2 depicts example states that correspond to the first phase of process 200, and the diagram 301 of FIG. 3 depicts example states that correspond to the second phase of process 200. The diagram 201 may include elements that are similar to those depicted in reference to FIG. 1. For example, a first person (e.g., user 205) may be similar to user 112 of FIG. 1 and an observation camera 203 may be similar to observation camera 108. A data store 221 may correspond to a local repository of the system (e.g., of resident device 102) within the home environment. Meanwhile, within respect to diagram 301, a second person 225 may be similar to user 114 of FIG. 1, observation camera 223 may be similar to observation camera 110, and system 235 may be similar to the resident device 102 of FIG. 1.

Turning to the process 200 in further detail, at block 202, the system may receive a first plurality of video frames during a first time period, whereby at least one of the frames shows a face of a first person. Using diagram 201 for further illustration, the first person (e.g., user 205) may approach the observation camera 203. In this example, the observation camera 203 may be positioned to observe activity near the entrance to the front door of the home. In this way, the observation camera 203 may observe the face and body of user 205, for example, as they approach the front door of the home during the first time period (e.g., during the morning). It should be understood that the observation camera 203 may be positioned at any suitable location such that the camera 203 may capture the face and non-facial body portion of user 205. Continuing with the example, a video feed may be transmitted by the observation camera 203 to the system (e.g., system 235, which may be similar to resident device 102 of FIG. 1), whereby the video feed includes the first plurality of video frames 207.

In some embodiments, the system may perform one or more operations to analyze frames of the first plurality of video frames 207. For example, with respect to a representative particular frame 214 of the first plurality of frames, the system may perform object detection of one or more objects within the frame. This may include, for example, detecting a face object, a non-facial body portion object (which may be sometimes referred to as a "body" object), etc. It should be understood that a plurality of persons may be shown in the particular frame 214, whereby more than one face object and/or body object may be detected. In some embodiments, any suitable object recognition algorithm may be utilized, for example, a type of neural network (e.g., a convolutional neural network (CNN)). Upon detecting the one or more objects, the system may generate a bounding box for particular objects. For example, with respect to frame 214, the system may generate a bounding box 211 that includes the body of user 205 (e.g., including the torso, arms, hands, legs, etc.). In some embodiments, any suitable region(s) may be captured within a bounding box (e.g., only the torso, only the arms, both the torso and head, the entire person, etc.). Also, the system may generate a bounding box 209 that includes the face (e.g., the front of the head) of user 205. In some embodiments, the system may determine which frames of the video feed to select for analysis as the first plurality of video frames 207 (e.g., every frame, or a sampling of frames).

As described herein, in some embodiments, a plurality of persons and/or other objects may be detected within a particular frame. Also, in some embodiments, the video feed (e.g., the first plurality of video frames 207) may correspond to an activity (e.g., movement) by the one or more person and/or objects. Accordingly, in some embodiments, the system may associate (e.g., track) bounding boxes of the same object across a plurality of frames. For example, suppose that the first plurality of video frames 207 shows user 205 walking as they approach the front door. Accordingly, each frame may show the body of user 205 in a different position, according to the gait of user 205. The system may determine a bounding box for the body (e.g., including the torso) of user 205 for each frame analyzed. The system may then analyze characteristics of the torso as it appears in each image, to determine if it is the same torso (or a different torso, of another person). For example, torsos that are similar in size and position (e.g., from frame to frame) may be associated with the same person (e.g., user 205), while torsos that are in different positions (e.g., larger than a predefined threshold difference in distance) and/or have different sizes between frames may be determined to be different persons. In this way, the system may track and associate bounding boxes of the same person across the first plurality of video frames 207. Accordingly, the system may similarly track a plurality of people within the first plurality of video frames 207. In some embodiments, a set of bounding boxes for a body (e.g., including a torso) for a given person (e.g., user 205) may be associated with one or more bounding boxes of the face of the given person For example, bounding box 211 may be included within a set of bounding boxes for the same person (e.g., user 205), which may be further associated with the bounding box 209 (and/or a set of facial bounding boxes) of the face of the same person. In this way, and, as described further herein, the system may subsequently associate one or more bodyprints (e.g., respectively determined from portions of the frames corresponding to the bounding boxes of the body of the person) with the face (and/or the identity) of the same person.

At block 204, the system identifies an identity of the first person based on recognizing the face shown in one or more frames of the first plurality of video frames. For example, continuing within the illustration of diagram 201, upon generating the bounding box 209 for the face of user 205, the system may perform a facial recognition process to recognize the face of user 205. For example, as described herein, prior to the first time period, the system may maintain and store information associated with the face of user 205. In some embodiments, this information may be stored utilizing a suitable data structure and/or format, for example, within a faceprint. In some embodiments, the faceprint may correspond to a multi-dimensional vector (e.g., a vector of 128 dimensions, or any suitable number of dimensions). In this example, a dimension of the faceprint may be associated with at least one characteristic of the face of the user 205 (e.g., a characteristic of the lips, the nose, the eyes, relative distances between facial landmarks, texture, color, etc.). In some embodiments, a machine learning model (e.g., a neural network) may be trained to output the faceprint vector. Although embodiments described herein may primarily describe performing facial recognition utilizing faceprints, embodiments should not be construed to be so limiting. Any suitable facial recognition algorithm may be utilized, for example, utilizing a machine learning algorithm (e.g., a CNN) to analyze pixel regions of an image. In some embodiments, a cluster of faceprints may be selected and/or stored in association with the identity of user 205 (e.g., a contact person of the home environment), whereby a faceprint may be selected for inclusion within the cluster at least in part because it provides a higher level of information gain/quality (e.g., compared to other candidate faceprints) that are suitable for performing facial recognition. For example, faceprints that respectively correspond to (e.g., and/or are generated from) images that capture the face of user 205 from different (e.g., unique) angles, lighting, location, etc. may be selected for inclusion within the cluster.

Continuing with the illustration of diagram 201, the system may perform facial recognition on the face associated with the bounding box 209 of user 205. For example, the system may determine a set of face (image) croppings 213 from the set of bounding boxes of the face that includes bounding box 209. The system may then generate one or more faceprints from the set of one or more face croppings 213. For example, a given image cropping may be used to generate a faceprint for the face of user 205. A machine learning model (e.g., detection model 106 of FIG. 1) of the system may then compare one or more faceprints (that were generated from the face croppings 213 of the first plurality of video frames 207) with the previously stored cluster of reference faceprints of user 205 (e.g., retrieved from data store 221 of the system). In some embodiments, the system may compare the one or more faceprints with a plurality of clusters of reference faceprints (e.g., stored in data store 221), respectively associated with different contacts of the home environment. In this example, the detection model may detect a match between at least one faceprint (e.g., from at least one frame, such as frame 214) and one of the faceprints of the clusters of reference faceprints stored on the system. Accordingly, the system may thereby determine the identity 215 of the user 205 as being "Person A" (e.g., a known contact of the home environment).

At block 206, the system may store first physical characteristic information of the first person in association with the identity of the first person. Continuing with the illustration of diagram 201, the system may generate one or more body croppings 219 from the first plurality of video frames 207 (e.g., from one or more bounding boxes). In some embodiments, a body image cropping may include any suitable portion(s) of the body. For example, a body image cropping may include only the torso, include both the torso and the head, include the whole body, etc. Diagram 201 depicts the whole body has being included within set of body croppings 219. Similar to as described with respect to generation of faceprints, a trained machine learning model (e.g., a sub-model of detection model 106) may determine first physical characteristic information 217 of the first person based on the set of body croppings. For example, the machine learning model may be trained to determine, for a given body cropping, physical characteristic information corresponding to one or more physical characteristics associated with the body. These characteristics may be associated with any suitable aspect of the body (e.g., body shape, color, texture, characteristics of clothing worn by the body, and or movement of the body). In some embodiments, this physical characteristic information may include non-facial characteristic information that may be used to identify a person, apart from performing facial recognition. In some embodiments, these characteristics may be associated with a particular part of the body (e.g., the torso, the back of the head, or arms, etc.), and/or any suitable combination of parts thereof. In some embodiments, these characteristics may be used to uniquely identify a person (e.g., user 205, with identity 215). In some embodiments, the first physical characteristic information 217 may be collectively represented by any suitable data structure (e.g., a bodyprint). As described herein, and, similar to a faceprint, a bodyprint may include a multidimensional vector (e.g., 128 dimensions, or any suitable number of dimensions). In some embodiments, a dimension of the bodyprint may be associated with at least one characteristic of the body. In some embodiments, an association between a dimension and at least one characteristic may be dynamically determined by the machine learning model upon the generation of the vector. In some embodiments, the system may utilize a vector structure (e.g., for a bodyprint and/or faceprint) in part to efficiently store data representing aspects of a face or body of a person. In some embodiments, a vector structure may also enable more efficient comparison of vectors (e.g., determining Euclidean distances and/or cosine similarities of vectors), for example, to enable more efficient identity detection. In some embodiments, the system may perform any suitable transformations to a cropping (and/or bounding box of an image) to prepare the cropping for input into a machine learning model so that a vector (e.g., faceprint and/or bodyprint) may be generated. In one example, a cropping of a torso may be resized (e.g., from a portrait image to a square image).

In some embodiments, the system may associate the first physical characteristic information 217 (e.g., the bodyprint of user 205) with the identity 215 of the first person ("Person A"), based in part on the previously performed facial recognition. This association may also be performed based on the system associating the body croppings 219 with the same face, as described herein (e.g., with respect to block 202). In some embodiments, any suitable association may be stored by the system with respect to images, facial characteristics (e.g., faceprints), body characteristics (e.g., bodyprints), and the identity of a person. In some embodiments, the system may store a cluster of bodyprints in association with the identity 215. For example, a bodyprint may be generated per body (image) cropping, whereby a select number of bodyprints may be included within the cluster of bodyprints (e.g., a reference cluster) based on being determined to have a higher information gain (e.g., unique body features for performing identity detection), compared with other bodyprints that were not included. In some embodiments, the one or more bodyprints and/or associations may be stored in the data store 221 for subsequent utilization, as described in reference to FIG. 3. Accordingly, block 206 may conclude the first phase of process 200 (e.g., indicated by the triangle marker "A").

As described herein, FIG. 3 illustrates a second phase of the process 200, whereby diagram 301 of FIG. 3 depicts example states that correspond to the second phase of process 200.

Turning to the second phase of process 200 in further detail (e.g., as indicated by the triangle marker "A"), at block 208, the system receives a second plurality of video frames 227 that show a second person during a second time period, whereby a face of the second person is determined to not be recognized by the system. For example, using diagram 301 for further illustration, the second time period may follow the first time period of phase one (e.g., a time period of the afternoon on the same day or different day). For example, user 205 may have entered the home environment 101 of FIG. 1 during the morning, and observation camera 223 (e.g., which may be similar to observation camera 110 of FIG. 1) may capture a video feed (including a second plurality of video frames) that shows the second person 225 at a later time during the afternoon. In this example, the second person 225 may be walking away from the camera 223 (e.g., with the face of the second person 225 facing away from the camera, so that the face is not captured by video frames of the video feed). In some embodiments, the face be captured by video feed, but may still be not recognizable by the system, for example, due to poor lighting conditions, image artifacts, occlusions, etc.

In some embodiments, the system may first attempt to perform facial recognition of the second person 225 based on the second plurality of video frames 227, similar to as described in reference to FIG. 2 (e.g., blocks 202 and/or 204). For example, the system may determine one or more bounding boxes for particular objects in each frame. In one example, for a representative frame of the second plurality of video frames 227, a bounding box 229 may correspond to the head of the second person 225 and bounding box 231 may correspond to the body (e.g., excluding the head) portion of the second person 225. The system may determine face croppings from the bounding boxes of the head of the second person 225 (e.g., potentially including a portion of the face, or not showing the face), determine faceprints from the face croppings, and then compare the faceprints against one or more reference clusters of faceprints (e.g., contacts of the home environment). In this case, the machine learning model (e.g., detection model 106) of the system may determine that the face may not be recognized (e.g., since the face may not be captured adequately to enable facial recognition with an acceptable level of confidence). In some embodiments, if the system is able to perform accurate facial recognition to determine the identity of the second person 225, then operations of block 210, which may involve performing identity recognition based on non-facial body characteristics, may not be performed. For example, these operations may be performed as a fallback mechanism in case facial recognition does not successfully determine the identity of the second person 225 with high confidence. In some embodiments, the system may perform operations of block 210 and/or 212 independent of whether facial recognition may successfully identity the identity of the second person. In some embodiments, the system may perform facial recognition in parallel to performing identity recognition based on non-facial body characteristics.

In some examples, however, using operations of block 210 as a fallback is completely optional. The system may decide whether to fallback to using bodyprints based on the quality of the face. In some cases, if the face is recognizable, the fallback to using bodyprints may not be utilized. However, if the face is not recognizable, the system may or may not fallback to using the bodyprints. In some examples, it may be advantageous to fallback to using bodyprint detection to attempt to identify a person regardless of whether the face was recognizable (e.g., in cases where the bodyprint comparison techniques yield high accuracy identifications). However, in some examples, the system may first determine whether a faceprint of the second person is identifiable (e.g., good quality) and recognizable, and then only compare the bodyprints of the second person to the gallery of bodyprints if the face is low quality and not recognizable as a known person (e.g., a contact). Alternatively, in some examples, the system may only use the physical characteristics of the second person when either a) the faceprint is of low quality (e.g., not high enough quality to detect the person) or b) the face is not present in the footage. Additionally, in some instances, physical characteristics of people who are not known to the user of the device/home environment may not be stored at all. This also helps reduce false positives by avoiding having bodyprints of unknown people stored in the bodyprint gallery of images.

Continuing with the operations of block 208, and, similar to as described with respect to block 202 of FIG. 2, the system may determine second physical characteristic information associated with the second person. For example, the system may determine body croppings based on the bounding boxes of detected objects in the second plurality of video frames 227. As described herein, a body cropping may include any suitable one or more portions of the body and/or associated articles of clothing. For example, a body cropping may include the head and torso of the person shown in an image. In another example a body cropping may include the whole body of the person shown in the image. In another example, a body cropping may include only a torso portion of the body (and/or association clothing). In some embodiments, a body cropping may correspond to a new image that is cropped from an original image. In some embodiments, a body cropping may correspond to a portion of the original image, whereby the parameters of the portion are determined and/or stored by the system. In any case, the system provide the one or more body croppings from respective frames of the second plurality of video frames 227 to a machine learning model (e.g., detection model 106), whereby the model may determine second physical characteristic information from a body cropping. For example, the system may determine a bodyprint for a particular body cropping, as described with respect to FIG. 2. In some embodiments, the system may determine a plurality of bodyprints from a sampling of frames of the second plurality of video frames 227.

At block 210, the system may compare first physical characteristic information of the first person with second physical characteristic information of the second person, whereby the first physical characteristic information may be previously stored in association with the identity of the first person. For example, recall that at block 206 of FIG. 2, the system stored the first physical characteristic information 217 (e.g., a bodyprint) in association with the identity of the first person. In some embodiments, the system may have stored a cluster of bodyprints in association with the identity 215 of the first person (e.g., "Person A"). In this example, note that a bodyprint corresponding to the first physical characteristic information was generated based on a body image cropping whereby the first person was facing towards the camera. Meanwhile, a bodyprint corresponding to the second physical characteristic information was generated based on a body image cropping whereby the second person (who may or may not be the same identity as the first person) was facing away from the camera. While these aspects of croppings may differ, note also that the first person and the second person are shown as wearing the same clothing (e.g., a plaid shirt). One or more dimensions of the respective bodyprints may also capture this information, which may be used to compare bodyprints to determine if there is a match. In another example, the bodyprints may be associated a color of the shirt, a shape of the body and/or shirt, a shape of the head, a texture of the shirt, etc. In some embodiments, one or more of these characteristics may remain substantially similar (e.g., same) over a period of time, independent of whether the user may be facing towards the camera or away from the camera. Accordingly, the machine learning model of the system may be trained to generate similar bodyprints of the same person with similar body characteristics (e.g., the same color and/or pattern of shirt, the same body shape, etc.), independent of whether the person may be facing towards or away from a camera in respective photos. The machine learning model may also be trained to generate similar bodyprints of the same person's body, despite some feature differences between the person's body captured in different frames. For example, the model may generate similar bodyprints of the body, despite the body being shown with a slightly different size between images and/or a slightly different lighting between images. Also, as described herein, it should be understood that the cluster of reference bodyprints (e.g., including a bodyprint for the first physical characteristic information 217) may be respectively associated with different vantage points of the body (e.g., different viewing angles, etc.), and similarly, for the cluster of bodyprints generated from the second plurality of video frames (e.g., including the second physical characteristic information 233). Accordingly, the system may be enabled to perform a wider and/or more accurate range of bodyprint comparisons and be resilient for analyzing body characteristics from different vantage points as part of that comparison. In one example, the system may generate a score based on the comparison, whereby the score may correspond to a level of similarity (e.g., a Euclidean distance) between different bodyprints.

At block 211, the system may determine a confidence score for the second physical characteristic information (e.g., bodyprint/torso), and use that score to determine whether to include the new second physical characteristic information in the cluster of bodyprints. For example, if the confidence score is above a threshold (and the face was recognized), the newly identified bodyprint (e.g., second physical characteristic information) will be included in the cluster of bodyprints. However, if either the face was not recognized or the confidence score is below the threshold, then the newly identified bodyprint will be discarded after the operations of block 210 are performed.

At block 212, the system may provide a notification that an identity of the second person matches the identity of the first person. For example, suppose that at block 210, the system determined that the first physical characteristic information 217 matched the second physical characteristic information 233. In this example, the system may determine a score that matches a predefined threshold metric (e.g., greater than or equal to the predefined threshold, for example, 90%). The system may then determine that the identity of the second person matches the identity of the first person based on the comparison. If the score does not match the threshold metric, then the system may determine that the identity of the second person does not match the identity of the first person. In the example of process 200, the system determines that there is a match, and thus, the second person 225 is likely "Person A" (e.g., having identity 215). Accordingly, in this example, where the system 235 may correspond to a smart speaker device, the system provides a notification in the form of an audio announcement, "I've detected someone who may be Person A." In some embodiments, as described further in reference to FIG. 4, the system may provide the notification for presentation according to any suitable method (e.g., audio, video, text, etc.).

Figure 4:
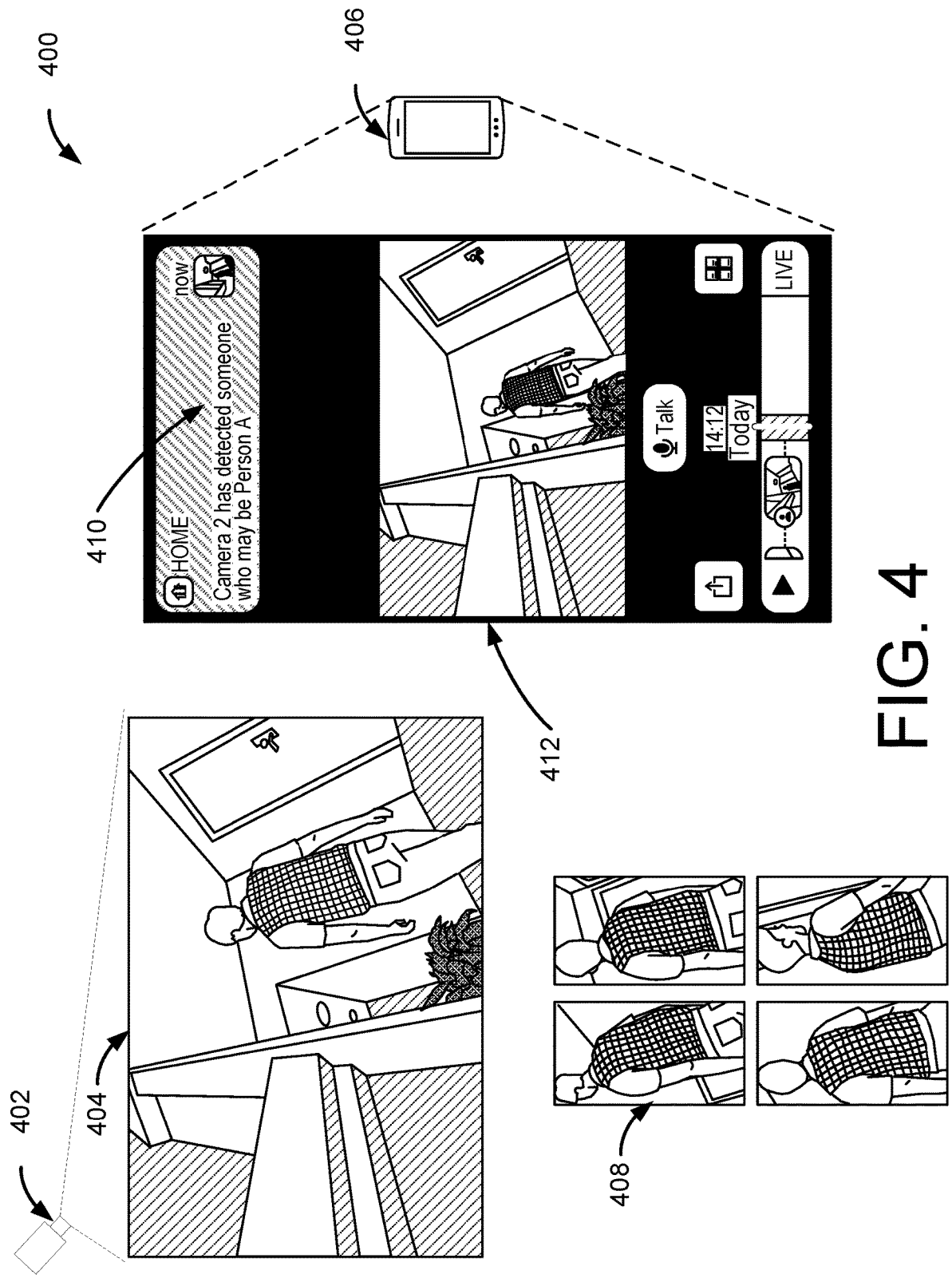
FIG. 4 is another simplified block diagram illustrating at least some example techniques involving a user interface (UI) for providing a notification based on determining the presence of a particular person at a location, according to some embodiments.

FIG. 4 is another simplified block diagram illustrating at least some example techniques for providing a notification based on determining the presence of a particular person at a location, according to some embodiments. In diagram 400 of FIG. 4, several elements are depicted, including observation camera 402, a video feed 404, body croppings 408, a user device 406, a pop-up notification 410, and a video presentation 412. Diagram 400 depicts a scenario in which observation camera 402 captures and transmits a video feed 404 to a device (e.g., resident device 102 of FIG. 1), whereby the resident device analyzes the video feed 404 and transmits a notification to the user device 406 to alert a user of the presence of a particular person (e.g., "Person A") at a particular location being observed by the observation camera 402.

Turning to FIG. 4 in further detail, an observation camera may be positioned at any suitable location. For example, the observation camera 402, which may be similar to observation camera 110 of FIG. 1, may be positioned in an interior (e.g., living room corridor) setting. Camera 402 may be positioned at approximately waist level. In some embodiments the camera may be positioned closer to the ground, mounted to have a bird's eye view, or any suitable elevation such that the camera may capture at least a portion of a person's body and/or face. In some embodiments, the position of a camera may depend on one or more factors, including, for example, a number of cameras, the location of each camera, expected traffic patterns around the location of the camera, etc. For example, suppose that observation camera 402 is a sole camera that is connected to the resident device of the home environment that performs identity detection. In this example, observation camera 402 may be positioned to capture both a face of a person approaching the camera 402 during a first time period (e.g., entering the living room corridor), which may correspond to the first phase of process 200, as well as the body of the person facing/moving away from the camera 402 during a second time period (e.g., leaving the living room corridor), which may correspond to the second phase of process 200. The video feed 404 shows an example in which a person may be walking away from the camera, whereby the face of the person may not be captured by the video feed 404 such that it may be recognized by the resident device. In another example, where there may be two or more connected cameras (e.g., similar to FIG. 1), a first camera may be positioned to primarily capture the face of a person (e.g., entering a home), while a second camera may be positioned such that it primarily captures the backside of the person (e.g., showing primarily non-facial features of the person). In this example, and as described herein, techniques may enable the system to identify the identity of the person captured by the video feed of the second camera (and/or the first camera, for example, when the person is leaving the home), even though the face may not recognized by the system.

As described herein, body croppings 408 may be generated based on a plurality of video frames of the video feed 404. For example, as the person walks away from the observation camera 402, the video feed 404 may capture different positions of the person's torso, arms, and/or head. It should be understood that other objects (e.g., people, plants, doors, etc.) may also be captured within a video frame, whereby the system detects and isolates (e.g., via a bounding box and/or cropping) a particular person's body within one or more video frames. In some embodiments, the plurality of body croppings 408 may be similar to as described in reference to the body croppings generated at block 208 of the second phase of process 200. The resident device may thereby generate a set of bodyprints, respective for the body croppings. Note that each bodyprint may capture a different (or similar) vantage point of the person, whereby a bodyprint may be compared against one or more of a reference cluster of bodyprints (e.g., determined during phase one of process 200, and/or any suitable previous time).

In the example of diagram 400, upon comparing previously stored reference bodyprints with the bodyprints of the person shown in the body croppings 408, the resident device determines that the person likely matches the identity of "Person A." The resident device (e.g., a digital media player) generates a notification message and transmits the message to at least user device 406. The message indicates that the resident device has detected that Person A likely is (or was) near the vicinity of the area that observation camera 402 (e.g., "Camera 2", as indicated in the pop-up notification 410) is monitoring. In one example, the user device 406 then displays the pop-up notification 410, indicating that "Camera 2 has detected someone who may be Person A." In some embodiments, an application executing on the user device 406 may also (and/or alternatively) show the video presentation 412 of the area being observed by the camera 402, thus enabling a user to visualize the person being identified and/or the surrounding area (e.g., for providing context). In some embodiments, the application may enable any suitable features, for example, enabling the user of the user device to transmit an audio message (pressing a "Talk" button) for output (e.g., via a smart speaker) near the area where the detected person was observed. In another example, the application may enable the user to scan through frames of the video feed, capture one or more frames, share images with others, etc.

As described herein, it should be understood that any suitable operations may be performed based on detecting the identity of a person, according to techniques herein. In some non-limiting examples, the resident device may provide instructions for automatically adjusting a smart thermostat in a particular room, adjusting a lighting in a room, playing music via a smart speaker, etc.

Figure 5:
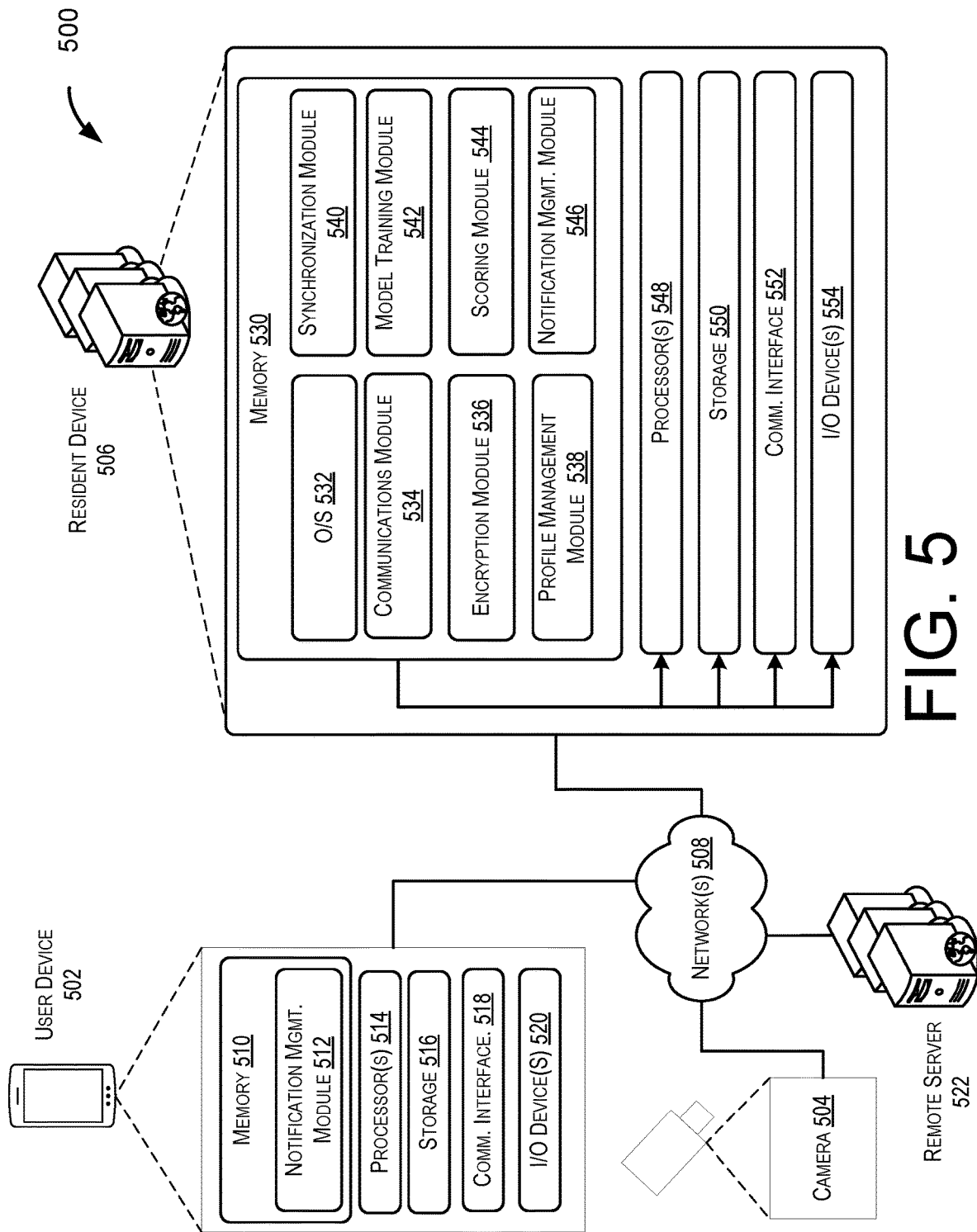
FIG. 5 is another simplified block diagram illustrating an example architecture of a system used to provide notifications based on determining the presence of a particular person at a location, according to some embodiments.

FIG. 5 is another simplified block diagram illustrating an example architecture of a system used to provide notifications based on determining the presence of a particular person at a location (e.g., within a home environment context), according to some embodiments. The diagram 500 includes a user device 502 (e.g., which may have an integrated camera component), an observation camera 504, a resident device 506, a network 508, and a remote server 522. The user device 502, the observation camera 504, and the resident device 506, respectively, may be similar to any of the user devices, observation cameras, and/or resident devices described herein. The remote server 522 may correspond to one or more server computers (e.g., a server cluster) of a cloud computing platform, as described herein. In some embodiments, the user device 502 and/or the resident device 506 may include the camera 504 as an integrated component. In some embodiments, the camera 504 may be included within a separate device from the user device 502 and/or the resident device 506. For example, as described herein, the camera 504 may be communicatively connected to the user device 502 and/or the resident device 506.

The network 508 may include any suitable communication path or channel such as, for instance, a wire or cable, fiber optics, a telephone line, a cellular link, a radio frequency (RF) link, a WAN or LAN network, the Internet, or any other suitable medium. The network 508 may include any one or a combination of many different types of networks, such as cable networks, the Internet, wireless networks, cellular networks, and other private and/or public networks.

Turning to each element in further detail, the user device 502 may be any suitable computing device (e.g., a mobile phone, tablet, personal computer (PC), smart glasses, a smart watch, etc.). In some embodiments, the user device 502 will have a camera embedded as a component of the device (e.g., a mobile phone camera). In some embodiments, the user device 502 will be connected to another device (e.g., a standalone digital camera), from which it receives images (e.g., over the network 508). The user device 502 has at least one memory 510, one or more processing units (or processor(s)) 514, a storage unit 516, a communications interface 518, and an input/output (I/O) device(s) 520.

The processor(s) 514 may be implemented as appropriate in hardware, computer-executable instructions, firmware, or combinations thereof. Computer-executable instruction or firmware implementations of the processor(s) 514 may include computer-executable or machine executable instructions written in any suitable programming language to perform the various functions described.

The memory 510 may store program instructions that are loadable and executable on the processor(s) 514, as well as data generated during the execution of these programs. Depending on the configuration and type of user device 502, the memory 510 may be volatile (such as random access memory (RAM)) and/or non-volatile (such as read-only memory (ROM), flash memory, etc.). In some implementations, the memory 510 may include multiple different types of memory, such as static random access memory (SRAM), dynamic random access memory (DRAM) or ROM. The user device 502 may also include additional storage 516, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 516 may be utilized to storage a photo library containing one or more images on the user device 502.

The user device 502 may also contain the communications interface 518 that allow the user device 502 to communicate with a stored database, another computing device or server, user terminals, and/or other devices on the network(s) 508. The user device 502 may also include I/O device(s) 520, such as for enabling connection with a keyboard, a mouse, a pen, a voice input device, a touch input device, a display, speakers, a printer, etc.

Turning to the contents of the memory 510 in more detail, the memory 510 may include an operating system and one or more application programs or services for implementing the features disclosed herein, including a notification management module 512. The notification management module 512 may be responsible for performing one or more tasks, including configuring a notification service of the resident device 506 and/or sending (and/or receiving) data (e.g., image croppings) to the resident device 506. For example, the notification management module 512 may receive input for configuring the resident device with settings for providing notifications. As described herein, one example may be a setting that indicates that the resident device 506 should only provide a notification to the user device 502 if a person is detected that is (or is not) a contact associated with the user device (e.g., the person is not found in any of the images in a photo library in storage 516). In another example, a setting may indicate how a notification should be provided. For example, one setting may indicate that the resident device 506 should transmit a notification message to the user device 502. Another setting may indicated that the resident device should announce a notification on a speaker connected to the resident device 506. The notification management module 512 (e.g., via a service or background application running on the user device 502) may transmit images (e.g., image croppings generated from the photo library) to the resident device 506 for processing by the resident device 506. For example, the resident device 506 may generate faceprints (and/or clusters of reference faceprints) for contacts that correspond to images stored in the photo library on the user device 502. These images may be transmitted on any suitable cadence and/or selection algorithm. In some embodiments, the user device 502 may first encrypt images that are transmitted to the resident device 506. For example, the user device 502 and the resident device 506 may share an encryption key (e.g., a symmetric key), whereby the resident device 506 receives an encrypted image and then decrypts the image using the encryption key. In some embodiments, as described further herein, the encryption key may not be shared (or may be shared) with the remote server 522. In some embodiments, the images may be first transmitted to the remote server 522 (e.g., for temporary storage), and then later transmitted by the remote server 522 to the resident device 506. In some embodiments, the images may be transmitted directly to the resident device 506, without involving the remote server 522. It should be understood that one or more functions of the notification management module 512 may be performed by the resident device 506 (e.g., configuring the resident device).

In some embodiments, the observation camera 504 may correspond to any suitable camera for capturing and transmitting images to the resident device 506. In some embodiments, the observation camera 504 may be positioned (e.g., mounted) at a particular location to have a particular viewable area, for example, near the front door of a home. The observation camera 504 may be connected to the resident device 506 via network 508.

In some embodiments, as described above, the remote server 522 may correspond to a cloud computing platform. The remote server 522 may perform one or more functions, including, for example: training one or more machine learning models (e.g., similar to as described in reference to detection model 106 of FIG. 1), managing updates to detection models, receiving images from user devices (e.g., user device 502), transmitting images to a resident device 506, etc. As described above, in some embodiments, the remote server 522 may not (or may) have access to an encryption key used by the user device 502 to encrypt images. In some embodiments, remote server 522 may receive images from the user device 502 (and/or observation camera 504), for example, when the user device 502 does not have direct access to the resident device 506. In this example, the user device 502 may first transmit an encrypted image (e.g., image cropping) to the remote server 522 in the cloud. The cloud may store the encrypted image cropping for later transmission to the resident device 506. In some embodiments, the machine learning models (and/or submodels) may be trained to be used for any suitable purpose, including, for example, generating a faceprint, generating a bodyprint, comparing faceprints, comparing bodyprints, etc.

Turning to the resident device 506 in further detail, the resident device 506 may be a computer system that comprises at least one memory 530, one or more processing units (or processor(s)) 548, a storage unit 550, a communication device 552, and an I/O device 554. In some embodiments, these elements may be implemented similarly (or differently) than as described in reference to similar elements of user device 502. In some embodiments, the storage unit 550 may store images (e.g., image croppings) received by user device 502 and/or remote server 522. The resident device 506 may be housed in any suitable unit (e.g., a smart TV, a smart speaker, etc.). As described herein, it should be understood that one or more of the elements described in diagram 500 (e.g., user device 502, camera 504, and/or remote server 522) may be enabled to perform one or more of the operations of resident device 506.

Turning to the contents of the memory 530 in more detail, the memory 530 may include an operating system 532 and one or more application programs or services for implementing the features disclosed herein, including a communications module 534, an encryption module 536, a profile management module 538, a synchronization module 540, a model training module 542, a scoring module 544, and notification management module 546. In some embodiments, one or more application programs or services of memory 530 may be included as part of the notification service 104 of FIG. 1.

The communications module 534 may comprise code that causes the processor 548 to generate messages, forward messages, reformat messages, and/or otherwise communicate with other entities. For example, the communications module 534 may receive (and/or transmit) images from the user device 502 and/or remote server 522. The communications module 534 may also be responsible for providing notifications. For example, the communications module 534 may transmit a notification message to the user device 502 upon detecting the presence and/or identity of a person based on a plurality of video frames received from observation camera 504. In some embodiments, the communications module 534 may provide a notification using any suitable channel and/or to any suitable device. For example, the communications module 534 may provide an audible notification via a speaker I/O device 554 at a location within a home environment. In another example, the communications module 534 may provide an audiovisual notification to a smart TV within a home environment. For example, a PIP display of the smart TV may display a video feed from camera 504 (e.g., showing a walking through a corridor of a home, exiting a home, etc.). The smart TV may also announce who is at the door and/or allow two-way communication via a speaker and/or microphone I/O devices of the resident device 506.

The encryption module 536 may comprise code that causes the processor 548 to encrypt and/or decrypt messages. For example, the encryption module 536 may receive encrypted data (e.g., an encrypted image cropping) from the remote server 522. The encryption module 536 may include any suitable encryption algorithms to encrypt data in embodiments of the invention. Suitable data encryption algorithms may include Data Encryption Standard (DES), tripe DES, Advanced Encryption Standard (AES), etc. It may also store (e.g., in storage unit 550) encryption keys (e.g., encryption and/or decryption keys) that can be used with such encryption algorithms. The encryption module 536 may utilize symmetric or asymmetric encryption techniques to encrypt and/or verify data. For example, as noted above, the user device 502 may contain similar code and/or keys as encryption module 536 that is suitable for encrypting/decrypting data communications with the resident device (and/or remote server 522).

The profile management module 538 may comprise code that causes the processor 548 to maintain and store profiles of contacts. For example, the profile management module 538 may receive images (e.g., image croppings) from one or more user devices and/or cameras, each image cropping showing a portion of a face of a contact associated with the respective user device. The profile management module 540 may determine (e.g., via a trained model) facial characteristic information for a particular contact, which may include a cluster of one or more reference faceprints. The profile management module 540 may also determine non-facial physical characteristic information for the particular contact, which may include a cluster of one or more reference bodyprints. In some embodiments, this module 540 may associate an identity of the particular contact with facial characteristic information and/or non-facial characteristic information. In some embodiments, elements of the profile may be respectively updated according to any suitable cadence and/or heuristic. For example, facial characteristic information for a particular contact may be updated as new images are received that provide more information gain than the existing reference set of face images. In another example, non-facial physical characteristic information associated with the body may be updated according to a predefined schedule. For example, the system may update a cluster of bodyprints daily, based in part on a heuristic that indicates that a person may be likely to change their clothing on a daily basis. In another example, the system may be enabled to determine when a person's clothing has changed, and then update the cluster of bodyprints (e.g., reference bodyprints) to be up-to-date according to the latest clothing. In some embodiments, the profile management module 538 may store any suitable information that may be utilized for comparing with recently received sensor data (e.g., frames from a video feed of camera 504) to determine an identity of a person. For example, in another scenario, the system may store gait characteristic information that corresponds to a unique profile of a person's walking pattern. This gait characteristic information may be compared against reference gait information stored by the profile management module 538 to detect whether the detected gait of the person matches the reference gait profile. In some embodiments, any suitable number of bodyprints (e.g., 10, 20, etc.) may be stored within a cluster of bodyprints. In some embodiments, any suitable algorithm may be used to determine the amount of information gain provided by a particular bodyprint (e.g., a K-means clustering algorithm).

The synchronization module 540 may comprise code that causes the processor 548 to transmit and/or receive information associated with synchronizing profiles across a plurality of devices (e.g., associated with the same home environment). For example, as described herein, resident device 506 may determine one or more images (and/or associated faceprints or bodyprints) that provide a higher level of information gain when compared to existing reference images (and/or reference faceprints or bodyprints) for a particular person. The synchronization module 540 may then cause these one or more images to be transmitted as synchronization data to other resident devices of the home environment, whereby the receiving devices update reference data (e.g., images, faceprints, bodyprints, etc.) based on the received synchronization data. In this way, devices of the home environment may be synchronized with one another. It should be understood that any suitable device of the home environment may be synchronized according to the synchronization data (e.g., user device 502, remote server 522, etc.). In some embodiments, one or more devices may be configured to not be synchronized with other devices of the home environment.

The model training module 542 may comprise code that causes the processor 548 to train a machine learning model. The machine learning (ML) model may be trained to perform one or more sub-tasks, including, for example, generating a physical characteristic information (e.g., captured via a bodyprint vector or a motionprint vector), facial characteristic information (e.g., captured via faceprint vector), and/or perform vector comparisons (e.g., determine a cosine similarity) to identify whether a face (e.g., and/or body, gait, etc.) match is detected. In some embodiments, the model training module 542 may utilize any suitable machine learning technique. Some non-limiting examples may include utilizing a neural network, support vector machines, nearest neighbor approach, or decision trees. As a representative example, involving training the neural network to generate a bodyprint, the training process may begin whereby an untrained ML model receives a plurality of images (e.g., image croppings) of a particular person. This plurality of images may, respectively, include different portions of a body (e.g., including the torso) of the person. For example, one portion may be a side view, another portion may be a straight-on view, another portion may be an opposite side view, etc. Some portions may have different conditions and/or backgrounds, and/or may be captured by different devices (e.g., a camera of user device 502, observation camera 504, etc.). In some embodiments, each image of the plurality of images may be labeled as portraying the body of the same person. These labels may correspond to "ground truth" data. The neural network may be trained to receive as input one image of the plurality of images and output a first bodyprint of the body (e.g., torso portion) shown in the image. As described herein, the bodyprint may correspond to a multidimensional vector, whereby each dimension of the vector corresponds to a characteristic of the body of the person in the image (e.g., a distance between two known points on the body, a particular color or texture represented by pixels of the image, etc.). The neural network may also receive as input another image of the plurality of images and output a second bodyprint of the body (e.g., of the same person) shown in the other image. In some cases, the module 544 may associate the first bodyprint with the second bodyprint as corresponding to the same person. For example, as described above, each of the images may be labeled as the same person. Also, in some cases, the images may be labeled to describe the type of portion of the body that is portrayed (e.g., a side portion, a straight-on view, etc.). In some embodiments, the training algorithm may compute a similarity (e.g., cosine similarity or Euclidean distance) between the vectors of each bodyprint. Then, based at least in part on the output and a known similarity between images (e.g., based on the ground truth data of the labels), the training algorithm may adjust dimensions of one or more of the bodyprints. For example, as described above, the training algorithm may utilize a backpropagation algorithm to minimize a cost function associated with the distance between bodyprint (e.g., distance between bodyprint vectors). In some embodiments, this backpropagation algorithm may be used to tune (e.g., update) weights of nodes of the neural network. In this way, the neural network may be trained to generate similar bodyprints from images of the same body, whereby the images may have varying levels of quality (e.g., being received from different cameras and/or under different lighting conditions) and/or show different portions of the body. The bodyprints may later be used by the trained model for efficient comparison during body recognition (e.g., at block 210 of FIG. 2). It should be understood that the ML model may be trained to generate bodyprints (and/or faceprints, etc.) based on training samples associated with any suitable number of persons (e.g., several hundred, thousand, etc.), and produce bodyprints (and/or faceprints) for each person that are suitable for subsequent comparison between prints. It should be understood that, in some embodiments, the operations of the model training module 542 may also be performed by the remote server 522.

The scoring module 544 may comprise code that causes the processor 548 to determine a score that corresponds to a level of similarity between first physical characteristic information (e.g., a bodyprint associated with a body of a first person) and a second physical characteristic information (e.g., a bodyprint associated with a body of a second person). In some embodiments, the scoring module 544 may utilize a trained ML model (e.g., via the model training module 542) to generate and compare bodyprints to determine whether the identity of the first person matches the identity of the second person. In some embodiments, as described herein, the scoring module 544 may first generate a score by comparing faceprints between the first person and the second person. In the event that the score matches a threshold metric, the scoring module 544 may thereby determine a successful match based on the faceprints. In the event that the score does not match (e.g., is less than) the threshold metric, the scoring module 544 may generate and compare bodyprints of the first person and the second person (e.g., as a fallback mechanism). In another example, both faceprint and bodyprint recognition may be performed parallel. In at least this way, techniques described herein enable identity recognition to be performed across a wider range of use cases and with a higher level of recall and/or precision.

The notification management module 546 may comprise code that causes the processor 548 to store and manage settings for providing notifications, as described herein. The notification management module 546 may also be responsible for generating notifications that are provided by the communications module 534. It should be understood that a notification may presented in any suitable form (e.g., text, audio, video, and/or suitable combinations). In some embodiments, the notification management module 546 may be configured to performing no operation (e.g., a "no-op") in a particular setting. For example, the resident device 506 may be configured to only provide AV-based notifications to user device 502 if a detected person is not a known contact. Accordingly, if the resident device 506 detects a contact person, the notification management module 546 may determine to perform no operation (e.g., remaining silent, only logging the observation internally, etc.). In some embodiments, the notification management module 546 may also determine whether to provide notifications based on whether a face is recognizable or not. In some embodiments, even if the identity of the person is not detected, the notification management module 547 may still output a notification that a person (e.g., an unknown person) was detected.

Figure 6:
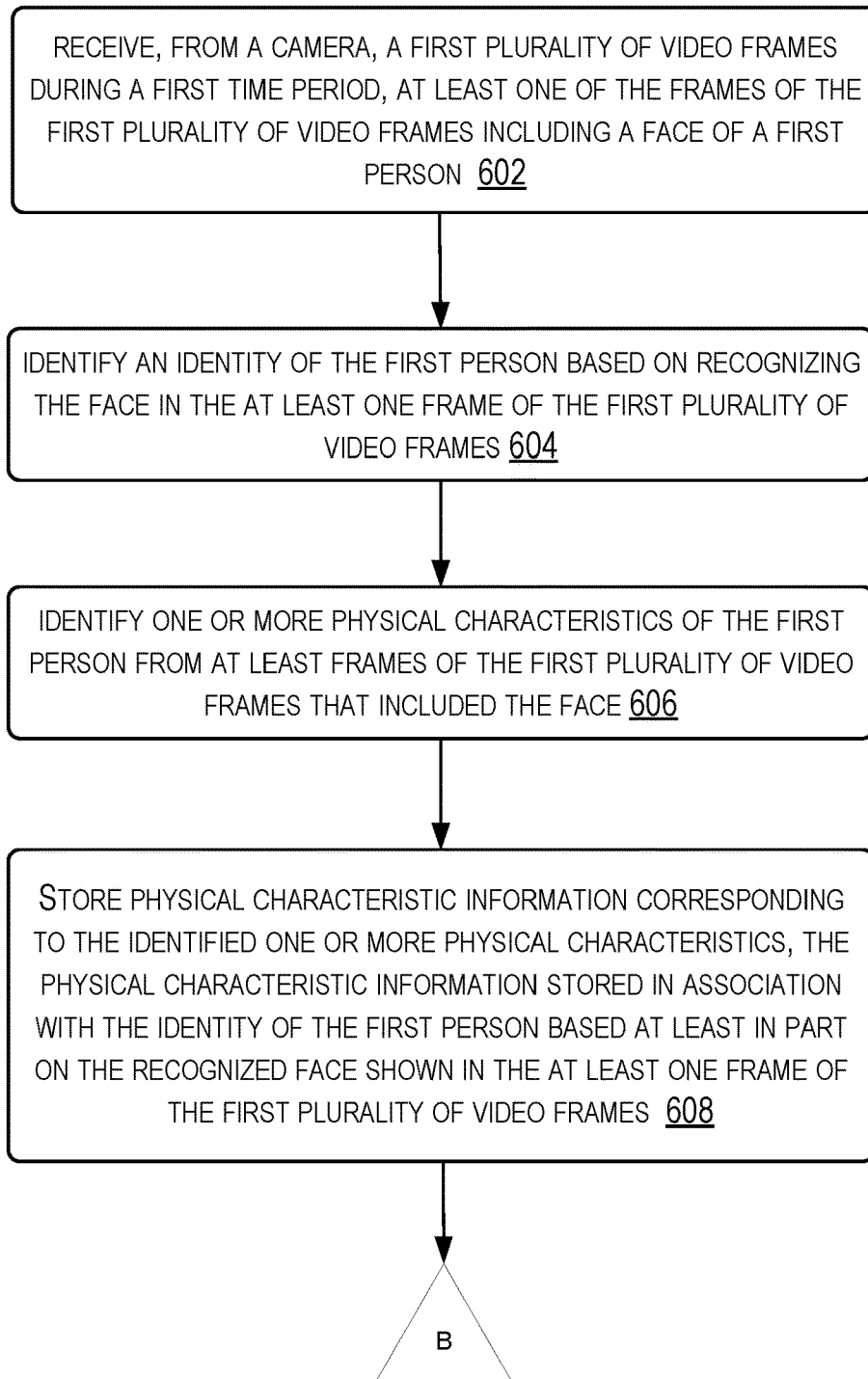
FIG. 6 is a simplified flow diagram illustrating a process for providing a notification based on determining the presence of a particular person at a location, according to some embodiments.
Figure 7:
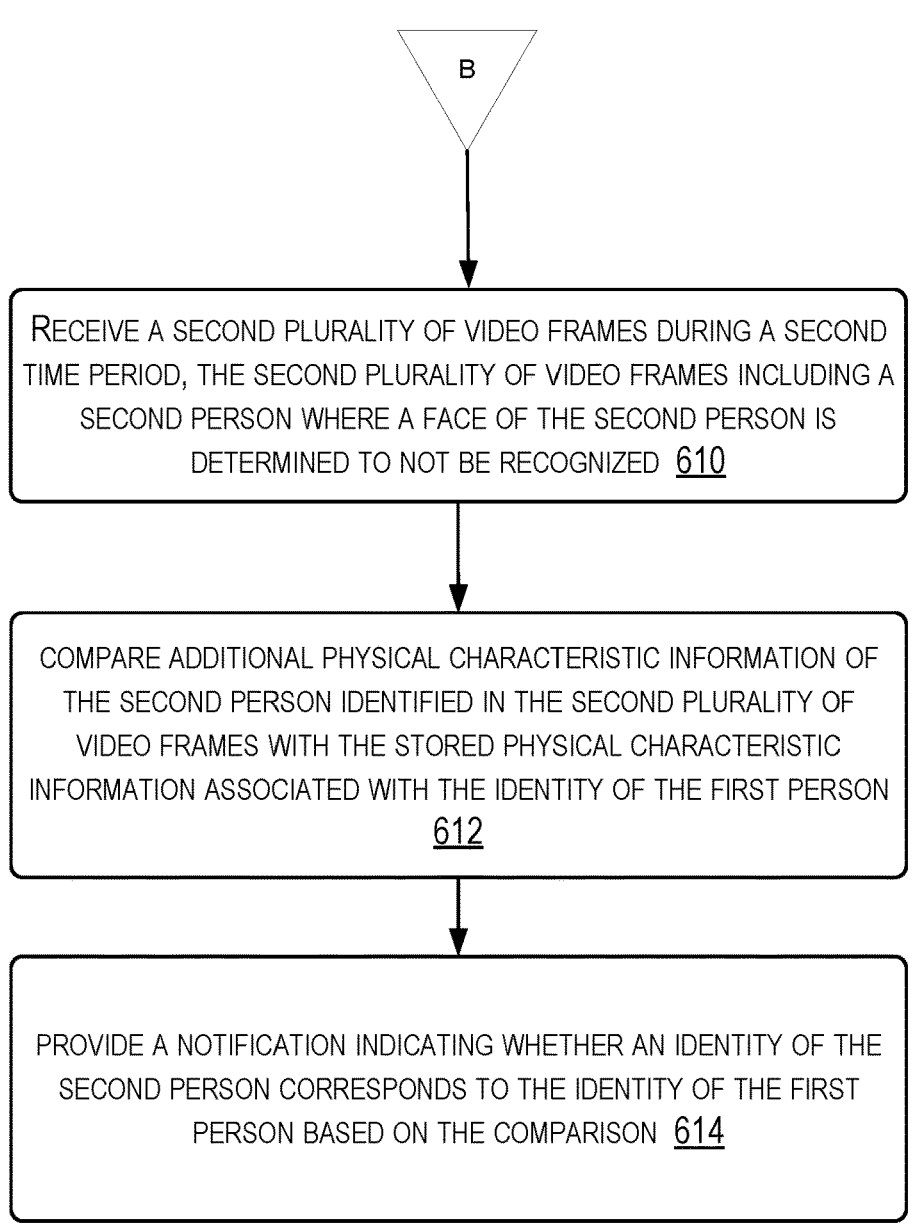
FIG. 7 is a simplified flow diagram illustrating a process for providing a notification based on determining the presence of a particular person at a location, according to some embodiments.

FIGS. 6 and 7 are simplified flow diagrams illustrating a process for providing a notification based on determining the presence of a particular person at a location, according to some embodiments. Process 600 of FIG. 6 may correspond to a first phase of the process (e.g., process 200 of FIG. 2), while process 700 of FIG. 7 may correspond to a second phase of the process (e.g., process 200 (e.g., as described in reference to FIG. 3)). While the operations of process 600 and/or 700 are described as being performed by a resident device of a home environment, it should be understood that any suitable device (e.g., a user device, a server device) may be used to perform one or more operations of these processes. Process 600 and process 700 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 602, during a first phase of the process, a first device (e.g., a resident device) may receive (e.g., from a first camera) a first plurality of video frames during a first time period, whereby at least one of the frames of the first plurality of video frames includes a face of a first person. In some embodiments, one or more operations of block 602 may be similar to one or more operations of block 202 of FIG. 2. In some embodiments, the first device may be one of a plurality of devices (e.g., of the home environment), which may be communicatively connected to one another. In some embodiments, this may facilitate synchronization operations (e.g., locally within the home environment), as described herein.

At block 604, the first device may identify an identity of the first person based on recognizing the face in at least one frame of the first plurality of frames. In some embodiments, one or more operations of block 602 may be similar to one or more operations of block 204 of FIG. 2.

At block 606, the first device may identify one or more physical characteristics of the first person from at least a frame of the first plurality of video frames that included the face. In some embodiments, the one or more characteristics are non-facial characteristics, for example, associated with a torso and/or the back of the head of the first person. In some embodiments, the one or more characteristics are associated with at least one of a gait, one or more arms, one or more legs, or a body shape. In some embodiments, the one or more physical characteristics of the first person are associated with at least one of a texture or color of at least one of a body of the first person or an article of clothing worn by the first person. In some embodiments, one or more operations of block 606 may be similar to one or more operations of phase one of FIG. 2.

At block 608, the first device may store physical characteristic information corresponding to the identified one or more physical characteristics, whereby the physical characteristic information may be stored in association with the identity of the first person based at least in part on the recognized face shown at least one frame of the first plurality of video frames. In some embodiments, one or more operations of block 608 may be similar to one or more operations of block 206. In some embodiments, the physical characteristic information corresponds to a bodyprint of the first person. The bodyprint may include a multidimensional vector, whereby a dimension of the vector may be associated with one or more physical characteristics of the first person. In some embodiments, the bodyprint may be one of a cluster of bodyprints (e.g., reference bodyprints) stored by the first device. The bodyprint may be selected for inclusion among the cluster of bodyprints based on an information gain associated with the bodyprint. In some embodiments, the first device may synchronize one or more bodyprints with one or more other devices of the home environment, for example, to ensure that the devices include a similar reference set of bodyprints (and/or faceprints). In some embodiments, the first device may update a cluster of reference bodyprints for a person based on any suitable criteria. For example, the first device may subsequently receive a third plurality of video frames during a subsequent time period. The first device may determine that at least one of the one or more identified physical characteristics of the first person may have changed (e.g., wearing a different colored shirt) based at least in part on analyzing the third plurality of video frames. The first device may accordingly update the cluster of bodyprints with updated bodyprints determined from third plurality of video frames. In another example, the first device may update reference bodyprints according to a particular cadence (e.g., daily, weekly, the start of a new time period, etc.). In some embodiments, the first device may store more than one cluster of bodyprints for a particular person. For example, suppose that during one time period, the device stores physical characteristic information (e.g., a cluster of bodyprints) associated within the particular person wearing a particular clothing (e.g., a green patterned shirt). Furthermore, suppose that during another time period, the device stores other physical characteristics (e.g., another cluster of bodyprints) associated with the particular person wearing a different clothing (e.g., a red patterned shirt). In this example, the device may store both clusters of bodyprints for the same person. Accordingly, during a subsequent (e.g., present) time period (e.g., described in reference to a second phase, below), the device may compare one or more bodyprints generated during the present time period, respectively, with one or more of the plurality of previously stored clusters of bodyprints (e.g., reference clusters). In some embodiments, block 608 may conclude the first phase (e.g., indicated by triangle marker "B" in FIG. 6), whereby the second phase of the process may continue during a second time period, as illustrated by process 700 of FIG. 7.

Turning to the second phase of the process in further detail, at block 610, the device may receive a second plurality of video frames during a second time period. The second plurality of video frames may include a second person where a face of the second person may be determined to not be recognized by the first device. In some embodiments, one or more operations of block 610 may be similar to one or more operations of block 208 of FIG. 3. In some embodiments, the second plurality of video frames may be received by the same camera (e.g., the first camera) as the first plurality of video frames. In some embodiments, the second plurality of video frames may be received by a different camera (e.g., a second camera).

At block 612, the first device compares additional physical characteristic information of the second person identified in the second plurality of video frames with the stored physical characteristic information (e.g., the previously stored one or more bodyprint clusters) associated with the identity of the first person. In some embodiments, one or more operations of block 612 may be similar to one or more operations of block 210 of FIG. 3. In some embodiments, the additional physical characteristic information corresponds to one or more physical characteristics of the second person that are a same type of the one or more physical characteristics of the first person. In some embodiments, the comparison is performed using a machine learning model that is trained to associate a first bodyprint of the first person with a second bodyprint of the first person.

At block 614, the first device may provide a notification indicating whether an identity of the second person corresponds to the identity of the first person based on the comparison. In some embodiments, one or more operations of block 614 may be similar to one or more operations of block 212 of FIG. 3. In some embodiments, the notification may be provided based on a confidence score that is determined from the comparison at block 612. For example, the first device may determine that the confidence score matches a threshold metric (e.g., 90%), and then provide the notification accordingly.

Figure 8:
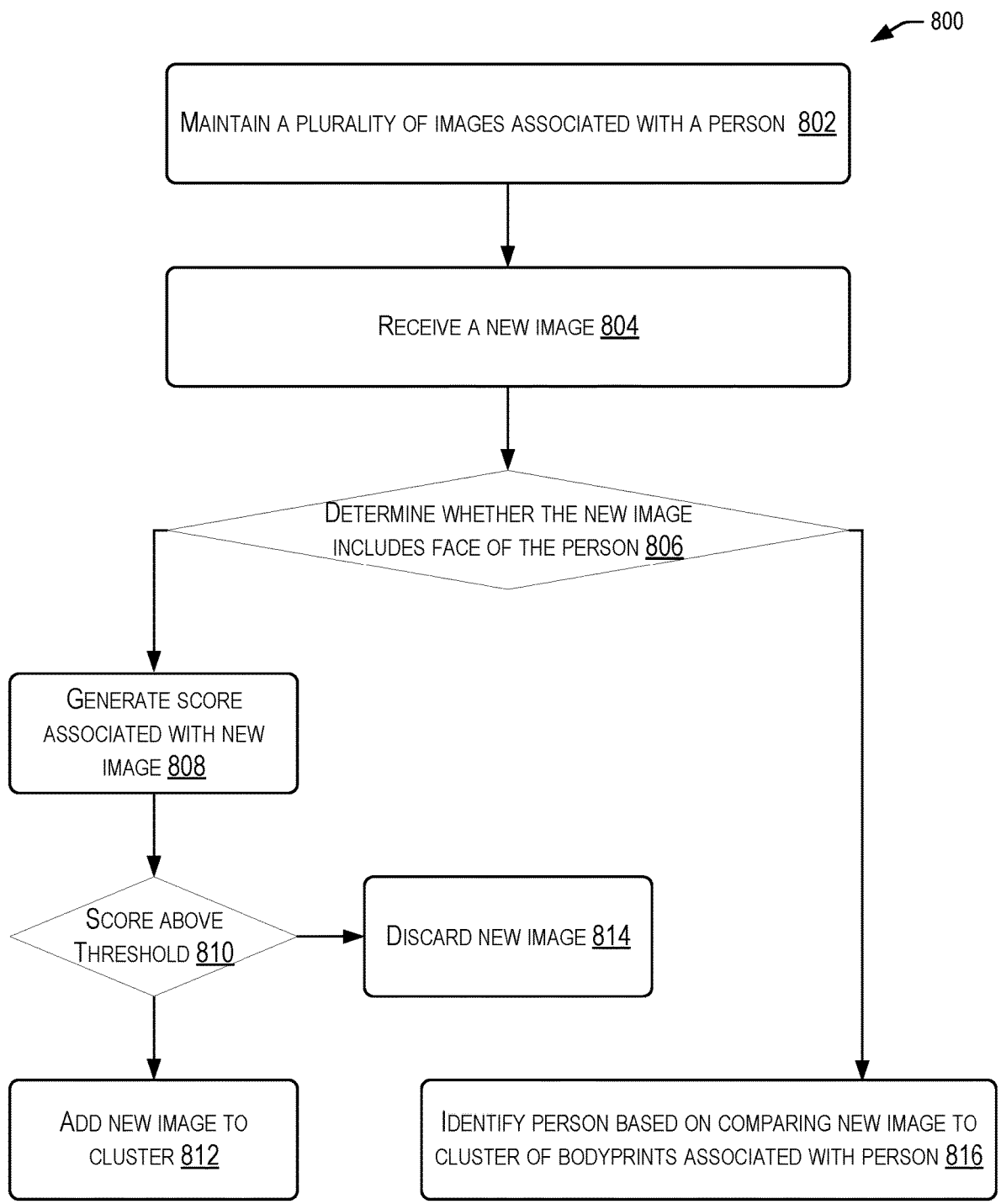
FIG. 8 is a simplified flow diagram illustrating a process for determining whether to add a newly identified bodyprint (e.g., torso image) to a cluster (e.g., gallery) of bodyprints for a known person, according to some embodiments.

FIG. 8 is a simplified flow diagram illustrating a process for determining whether to add a bodyprint image to a cluster of bodyprint images corresponding to a recognized person, according to some embodiments. While the operations of process 800 are described as being performed by a resident device of a home environment, it should be understood that any suitable device (e.g., a user device, a server device) may be used to perform one or more operations of these processes. Process 800 (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 802, a computing device (e.g., a residence device) may maintain (or generate and then maintain) a plurality of images associated with a person. The plurality of images may be a collection of physical characteristics including, but not limited to, facial characteristics and/or body characteristics (e.g., a torso) of the person. As discussed, the plurality (e.g., cluster and/or gallery) of images may correspond to a particular person (e.g., a contact of the user of the computing device).

At block 804, the computing device may receive a new image (e.g., from a camera or other video recorder). This new image may have been collected from the same or a different camera as other images of this person. The new image may include both facial and torso information.

At block 806, the computing device may determine whether the new image includes a face that is identifiable (e.g., good quality) and/or is a face of the person. That is, the process 800 will determine if the face is both clear enough to determine that it's a face, and also recognize (e.g., identify) the person as being in a list of contacts of the user. In some instances, if the face is not identifiable, then it will not be recognizable either. Since the process 800 may not fallback to using torsoprints in the event that the face was identifiable and/or recognized, and there will be instances where the face is identifiable but not recognizable, the process 800 will not fallback to using bodyprints (block 816), and will also not determine whether to add the new torsoprint to the cluster (blocks 808, 810). In these instances, the process 800 may end, not successfully identifying any person. In this case, the process 800 may provide a notification that an unidentified person was detected.

In accordance with a determination that the new image includes a face of the person (e.g., a recognizable person in a user's contacts), the computing device may generate a score associated with the new image (and/or the torso in the image) at block 808. The scores may be generated based on one or more (e.g., some combination) of the rules described above. For example, the score may be generated based on image characteristics such as saturation, contrast, brightness, and/or sharpness, whether the image is a false torso, or the like. At block 808, the computing device may determine whether the score is above a threshold (e.g., a quality threshold). If the score is above the threshold, the new image may be added to the cluster at block 812. However, if it is not above the threshold, the new image may be discarded at block 814.

Alternatively, in accordance with a determination that the new image does not include a face of the person (e.g., the face is not identifiable (low quality) or is not recognizable), the computing device may identify a person based on comparison of the new image to a cluster of bodyprints associated with the person at block 816. If identified, the computing device may notify users about the presence of the known/recognized person or the presence of an unrecognized person. In some examples the process 800 may only proceed to block 816 if the image did not have a face or if a face in the image was of such low quality that it was not identifiable (e.g., it would not be possible to recognize the user).

Illustrative techniques for providing a notification based on determining the presence of a particular person at a location and determining whether to add a bodyprint to a cluster of bodyprints for a recognized person are described above. Some or all of these techniques may, but need not, be implemented at least partially by architectures such as those shown at least in FIGS. 1-7 above. While many of the embodiments are described above with reference to resident devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data (e.g., images of people) to perform facial recognition. The present disclosure contemplates that in some instances, this gathered data may include personally identifiable information (PII) data that uniquely identifies or can be used to contact or locate a specific person. Such personal information data can include facial and/or non-facial characteristics of a person's body, demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to identify a person as being a contact (or not known contact) of a user of a user device.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving, by at least one device of a plurality of devices and from a camera, a first plurality of video frames during a first time period, at least one of the frames of the first plurality of video frames including a face of a first person;
   identifying, by the at least one device of the plurality of devices, an identity of the first person based at least in part on recognizing the face in the at least one frame of the first plurality of video frames;
   identifying, by the at least one device of the plurality of devices, one or more physical characteristics of the first person from at least a frame of the first plurality of video frames that included the face;
   storing, by the at least one device of the plurality of devices, a physical characteristic information corresponding to the identified one or more physical characteristics, the physical characteristic information stored in association with the identity of the first person based at least in part on the recognized face shown in the at least one frame of the first plurality of video frames;
   receiving, by the at least one device of the plurality of devices, a second plurality of video frames during a second time period, the second plurality of video frames including a second person where a face of the second person is determined to not be recognized by the at least one device;
   comparing, by the at least one device of the plurality of devices, additional physical characteristic information of the second person identified in the second plurality of video frames with the stored physical characteristic information associated with the identity of the first person; and
   providing, by the at least one device of the plurality of devices, a notification indicating whether an identity of the second person corresponds to the identity of the first person based at least in part on the comparison.

2. The method of claim 1, wherein the one or more physical characteristics of the first person are associated with at least one of a torso, a gait, one or more arms, one or more legs, or a body shape of the first person.

3. The method of claim 1, wherein the one or more physical characteristics of the first person are associated with at least one of a texture or color of at least one of a body of the first person or an article of clothing worn by the first person.

4. The method of claim 1, wherein the additional physical characteristic information corresponds to one or more physical characteristics of the second person that are a same type of the one or more physical characteristics of the first person.

5. The method of claim 1, wherein the physical characteristic information corresponds to a bodyprint of the first person, the bodyprint including a multidimensional vector, a dimension of the vector associated with one or more of the physical characteristics of the first person.

6. The method of claim 1, wherein the comparison is performed using a machine learning model that is trained to associate a first bodyprint of the first person with a second bodyprint of the first person.

7. The method of claim 1, wherein providing the notification further comprises:
   determining, by the at least one device of the plurality of devices, a confidence score based at least in part on the comparison;

determining, by the at least one device of the plurality of devices, that the confidence score matches a threshold metric; and providing, by the at least one device of the plurality of devices, the notification that indicates that the identity of the second person matches the identity of the first person.

8. The method of claim 1, further comprising:

storing, by the at least one device of the plurality of devices, information that corresponds to the face of the first person in association with the identified identity.

9. The method of claim 1, further comprising:

storing, by the at least one device of the plurality of devices, a cluster of bodyprints of the first person based at least in part on the first plurality of video frames, a bodyprint of the cluster being associated with a particular frame of the first plurality of video frames and selected for inclusion among the cluster of bodyprints based at least in part on an information gain associated with the bodyprint, the information gain used to perform the comparison between the additional physical characteristic information of the second person and the physical characteristic information of the first person.

10. The method of claim 1, wherein the plurality of devices includes a first device and a second device that are associated with a home environment setting, the method further comprising:

generating, by the first device, a bodyprint of the first person from a frame of the first plurality of video frames;

determining, by the first device, that the bodyprint will be added to a cluster of bodyprints associated with the first person based at least in part on an information gain associated with the bodyprint; and transmitting, by the first device, the bodyprint to the second device, the bodyprint being stored by the second device among a second cluster of bodyprints maintained by the second device, wherein respective clusters of bodyprints are synchronized between the first device and the second device.

11. The method of claim 1, wherein the at least one device receives the second plurality of video frames from a second camera, and wherein the camera is positioned in association with an entrance to a home environment and the second camera is positioned in association with an interior corridor of the home environment.

12. The method of claim 1, further comprising:

determining, by the at least one device of the plurality of devices, to update a cluster of bodyprints associated with the first person, a bodyprint of the cluster associated with the stored physical characteristic information associated with the first person.

13. The method of claim 12, wherein the cluster of bodyprints is updated based at least in part on determining a start of a new time period.

14. The method of claim 13, further comprising:

receiving, by the at least one device of the plurality of devices, a third plurality of video frames during a third time period;

determining, by the at least one device of the plurality of devices, that at least one of the one or more identified physical characteristics of the first person have changed based at least in part on analyzing the third plurality of video frames; and determining, by the at least one device of the plurality of devices, to update the cluster of bodyprints associated with the first person based at least in part on determining that at least one of the one or more identified physical characteristics of the first person have changed.

15. The method of claim 12, wherein the physical characteristic information corresponds to a bodyprint of the first person, wherein a cluster of bodyprints of the first person are generated based at least in part on the first plurality of video frames, and wherein the cluster of bodyprints, respectively, are associated with the identity of the first person based at least in part on the recognition of the face in the at least one frame of the first plurality of video frames.

16. The method of claim 1, wherein the camera is a separate device that is communicatively connected to the at least one device of the plurality of devices, and wherein the camera is configured to transmit the first plurality of video frames to the at least one device.

17. A device, comprising:

a memory comprising computer-executable instructions; and one or more processors in communication with the memory and configured to access the memory and execute the computer-executable instructions to at least:

receive, from a camera, a first plurality of video frames during a first time period, at least one of the frames of the first plurality of video frames including a face of a first person;

identify an identity of the first person based at least in part on recognizing the face in the at least one frame of the first plurality of video frames;

identify one or more physical characteristics of the first person from at least a frame of the first plurality of video frames that included the face;

store a physical characteristic information corresponding to the identified one or more physical characteristics, the physical characteristic information stored in association with the identity of the first person based at least in part on the recognized face shown in the at least one frame of the first plurality of video frames;

receive a second plurality of video frames during a second time period, the second plurality of video frames including a second person where a face of the second person is determined to not be recognized by the at least one device;

compare additional physical characteristic information of the second person identified in the second plurality of video frames with the stored physical characteristic information associated with the identity of the first person; and provide a notification indicating whether an identity of the second person corresponds to the identity of the first person based at least in part on the comparison.

18. The device of claim 17, wherein the physical characteristic information corresponds to a bodyprint of the first person, the bodyprint including a multidimensional vector, a dimension of the vector associated with one or more of the physical characteristics of the first person.

19. One or more computer-readable storage medium comprising computer-executable instructions that, when executed by one or more processors of at least one device of a plurality of devices, cause the one or more processors to perform operations comprising:

receiving, from a camera, a first plurality of video frames during a first time period, at least one of the frames of the first plurality of video frames including a face of a first person;

identifying an identity of the first person based at least in part on recognizing the face in the at least one frame of the first plurality of video frames;

identifying one or more physical characteristics of the first person from at least a frame of the first plurality of video frames that included the face;

storing a physical characteristic information corresponding to the identified one or more physical characteristics, the physical characteristic information stored in association with the identity of the first person based at least in part on the recognized face shown in the at least one frame of the first plurality of video frames;

receiving a second plurality of video frames during a second time period, the second plurality of video frames including a second person where a face of the second person is determined to not be recognized by the at least one device;

comparing additional physical characteristic information of the second person identified in the second plurality of video frames with the stored physical characteristic information associated with the identity of the first person; and providing a notification indicating whether an identity of the second person corresponds to the identity of the first person based at least in part on the comparison.

20. The one or more computer-readable storage medium of claim 19, wherein providing the notification further comprises:

determining a confidence score based at least in part on the comparison;

determining that the confidence score matches a threshold metric; and providing the notification that indicates that the identity of the second person matches the identity of the first person.

\* \* \* \* \*